United States Patent
Ashourian et al.

(10) Patent No.: US 10,542,769 B2
(45) Date of Patent: *Jan. 28, 2020

(54) METHODS OF MAKING SNACK FOOD PRODUCTS AND PRODUCTS MADE THEREBY

(71) Applicant: JimmyAsh LLC, Bakersfield, CA (US)

(72) Inventors: Jamshid Ashourian, Santa Monica, CA (US); Laurie J. Keeler, Lincoln, NE (US); Durward A. Smith, Lincoln, NE (US)

(73) Assignee: JimmyAsh LLC, Bakersfield, CA (US)

(*) Notice: Subject to any disclaimer, the term of this patent is extended or adjusted under 35 U.S.C. 154(b) by 475 days.

This patent is subject to a terminal disclaimer.

(21) Appl. No.: 14/444,731

(22) Filed: Jul. 28, 2014

(65) Prior Publication Data

US 2014/0335249 A1    Nov. 13, 2014

Related U.S. Application Data

(60) Division of application No. 14/055,994, filed on Oct. 17, 2013, now Pat. No. 8,980,353, which is a continuation of application No. 14/054,323, filed on Oct. 15, 2013, now Pat. No. 8,962,054, which is a continuation of application No. 12/090,845, filed as application No. PCT/US2006/038963 on Oct. 4, 2006, now Pat. No. 8,175,760.

(60) Provisional application No. 60/723,880, filed on Oct. 4, 2005, provisional application No. 60/820,743, filed on Jul. 28, 2006.

(51) Int. Cl.

| | | |
|---|---|---|
| *A23B 7/00* | (2006.01) | |
| *A23B 7/02* | (2006.01) | |
| *A23B 7/03* | (2006.01) | |
| *A23L 19/18* | (2016.01) | |
| *A23B 7/06* | (2006.01) | |
| *A23B 7/155* | (2006.01) | |
| *A23L 5/10* | (2016.01) | |

(52) U.S. Cl.
CPC ............. *A23L 19/18* (2016.08); *A23B 7/06* (2013.01); *A23B 7/155* (2013.01); *A23L 5/15* (2016.08); *A23V 2002/00* (2013.01)

(58) Field of Classification Search
CPC ........ A23L 1/212; A23L 1/216; A23L 1/2163; A23L 1/2125; A23L 1/217; A23L 1/2005; A23L 1/20; A23L 1/10; A23L 1/1643; A23L 19/18; A23L 19/09; A23L 19/03; A23P 20/11
USPC ....................................................... 426/443
See application file for complete search history.

(56) References Cited

U.S. PATENT DOCUMENTS

| | | |
|---|---|---|
| 585,843 A | 7/1897 | Girvin |
| 2,348,950 A | 5/1944 | Anderson |
| 2,801,083 A | 7/1957 | Balassa |
| 3,338,724 A | 8/1967 | Adler |
| 3,348,950 A | 10/1967 | Weiss |
| 3,436,229 A | 4/1969 | Simpson |
| 3,600,193 A | 8/1971 | Glebe et al. |
| 3,835,222 A | 9/1974 | Wisdom et al. |
| 3,922,370 A | 11/1975 | Prakash |
| 4,058,631 A | 11/1977 | Roan |
| 4,272,553 A | 6/1981 | Bengtsson et al. |
| 4,277,510 A | 7/1981 | Wicklund et al. |
| 4,511,583 A | 4/1985 | Olson et al. |
| 4,756,916 A | 7/1988 | Dreher et al. |
| 4,933,199 A | 6/1990 | Neel et al. |
| 5,004,616 A | 4/1991 | Shanbhag et al. |
| 5,059,435 A | 10/1991 | Sloan et al. |
| 5,061,507 A * | 10/1991 | Aulik et al. .................. 426/637 |
| 5,141,759 A | 8/1992 | Sloan et al. |
| 5,292,540 A | 3/1994 | Laufer |
| 5,312,631 A | 5/1994 | Yamashita |
| 5,370,898 A | 12/1994 | Zussman |
| 5,399,015 A | 3/1995 | Zhi-qiang et al. |
| 5,441,748 A | 8/1995 | Moyiyasu |
| 5,441,758 A | 8/1995 | Lewis et al. |
| 5,470,600 A | 11/1995 | Petelle et al. |
| 5,498,438 A | 3/1996 | Strong et al. |
| 5,603,973 A | 2/1997 | Benson et al. |
| 5,700,508 A | 12/1997 | Makishima et al. |
| 5,858,431 A | 1/1999 | Wiedersatz |
| 5,972,397 A | 10/1999 | Durance et al. |
| 6,010,726 A | 1/2000 | Evans et al. |
| 6,536,940 B1 | 3/2003 | Kolb et al. |
| 7,056,544 B2 | 6/2006 | Xu et al. |

(Continued)

FOREIGN PATENT DOCUMENTS

| | | |
|---|---|---|
| AU | 2006299381 B2 | 3/2013 |
| AU | 2015261665 B2 | 8/2017 |

(Continued)

OTHER PUBLICATIONS

"U.S. Appl. No. 12/090,845 , Response filed Jul. 5, 2013 to Final Office Action dated May 8, 2013", 21 pgs.

(Continued)

*Primary Examiner* — Jeffrey P Mornhinweg
(74) *Attorney, Agent, or Firm* — Schwegman Lundberg & Woessner, P.A.

(57) ABSTRACT

Methods of making low-fat or fat free snack food products, and products made according to the methods, in which food pieces are subjected to enzyme and/or cation treatment and/or specific cooking and/or drying techniques, to provide for snack food products having the texture, flavor, and other characteristics of conventional full-fat products.

22 Claims, No Drawings

(56) References Cited

U.S. PATENT DOCUMENTS

| | | |
|---|---|---|
| 7,696,252 B2 | 4/2010 | Pashley |
| 8,029,184 B2 | 10/2011 | Hoogland |
| 8,267,572 B2 | 9/2012 | Windhab et al. |
| 8,592,351 B2 | 11/2013 | Kaminsky |
| 8,703,226 B2 | 4/2014 | Bortone et al. |
| 8,715,760 B2 | 5/2014 | Ashourian et al. |
| 8,784,848 B2 | 7/2014 | Desjardins-Lavisse |
| 8,815,257 B2 | 8/2014 | Braksmayer et al. |
| 8,980,353 B2* | 3/2015 | Ashourian ............ A23B 7/06 426/443 |
| 9,615,601 B2 | 4/2017 | Ashourian et al. |
| 9,839,231 B2 | 12/2017 | Ashourian et al. |
| 2002/0004085 A1 | 1/2002 | Xu et al. |
| 2004/0058046 A1 | 3/2004 | Zyzak et al. |
| 2004/0101607 A1 | 5/2004 | Zyzak et al. |
| 2004/0170736 A1 | 9/2004 | Ross et al. |
| 2008/0026122 A1 | 1/2008 | Bows et al. |
| 2009/0192068 A1 | 7/2009 | Ogasawara et al. |
| 2009/0304865 A1 | 12/2009 | Ashourian et al. |
| 2014/0044833 A1 | 2/2014 | Ashourian et al. |
| 2014/0057020 A1 | 2/2014 | Ashourian et al. |
| 2015/0335047 A1 | 11/2015 | Ashourian |
| 2017/0115060 A1 | 4/2017 | Ashourian et al. |
| 2017/0188614 A1 | 7/2017 | Ashourian et al. |
| 2018/0184697 A1 | 7/2018 | Ashourian et al. |

FOREIGN PATENT DOCUMENTS

| | | |
|---|---|---|
| BY | 1917 C1 | 12/1997 |
| CA | 2624753 C | 2/2014 |
| CN | 1020469 C | 5/1993 |
| CN | 1543851 A | 11/2004 |
| CN | 1554274 A | 12/2004 |
| CN | 203494459 U | 5/2014 |
| CN | 105533537 A | 5/2016 |
| CN | 108289495 A | 7/2018 |
| EA | 015313 B1 | 6/2011 |
| EP | 1933639 B1 | 8/2016 |
| GB | 2254994 A | 10/1992 |
| IN | 201817007021 A | 6/2018 |
| JP | 6508518 A | 9/1994 |
| JP | 10136928 A | 5/1998 |
| JP | 11508454 A | 7/1999 |
| JP | 2000511763 A | 9/2000 |
| JP | 2001510686 A | 8/2001 |
| JP | 2004521651 A | 7/2004 |
| JP | 2004357592 A | 12/2004 |
| JP | 2008534680 A | 8/2008 |
| JP | 2009509567 A | 3/2009 |
| JP | 5014348 B2 | 6/2012 |
| JP | 2014036664 A | 2/2014 |
| JP | 2018521681 A | 8/2018 |
| MX | 348088 | 5/2017 |
| NZ | 567259 | 11/2011 |
| RU | 1762871 A1 | 9/1992 |
| RU | 95117559 A | 4/1998 |
| RU | 2170033 C2 | 7/2001 |
| WO | WO-9857554 A1 | 12/1998 |
| WO | WO-03026443 A1 | 4/2003 |
| WO | WO-2004047542 A1 | 6/2004 |
| WO | WO-2005053434 A1 | 6/2005 |
| WO | WO-2007041679 A2 | 4/2007 |
| WO | WO-2007041679 A3 | 4/2007 |
| WO | WO-2009117192 A1 | 9/2009 |
| WO | WO-2013-072056 A1 | 5/2013 |
| WO | WO-2013098673 A1 | 7/2013 |
| WO | WO-2017024069 A1 | 2/2017 |

OTHER PUBLICATIONS

"U.S. Appl. No. 12/090,845, Advisory Action dated Jul. 25, 2013", 3 pgs.

"U.S. Appl. No. 12/090,845, Examiner Interview Summary dated Feb. 12, 2014", 3 pgs.

"U.S. Appl. No. 12/090,845, Examiner Interview Summary dated Jun. 20, 2013", 4 pgs.

"U.S. Appl. No. 12/090,845, Final Office Action dated May 8, 2013", 30 pgs.

"U.S. Appl. No. 12/090,845, Final Office Action dated Dec. 7 2011", 31 pgs.

"U.S. Appl. No. 12/090,845, Non Final Office Action dated Jun. 9, 2011", 42 pgs.

"U.S. Appl. No. 12/090,845, Non Final Office Action dated Jul. 6, 2012", 36 pgs.

"U.S. Appl. No. 12/090,845, Non Final Office Action dated Dec. 6, 2013", 38 pgs.

"U.S. Appl. No. 12/090,845, Non Final Office Action dated Dec. 19, 2013", 38 pgs.

"U.S. Appl. No. 12/090,845, Notice of Allowance dated Mar. 14, 2014", 13 pgs.

"U.S. Appl. No. 12/090,845, Preliminary Amendment filed Oct. 30, 2013", 10 pgs.

"U.S. Appl. No. 12/090,845, Preliminary Amendment dated Jan. 30, 2009", 25 pgs.

"U.S. Appl. No. 12/090,845, Preliminary Amendment dated Apr. 18, 2008", 17 pgs.

"U.S. Appl. No. 12/090,845, Response filed Jan. 7, 2013 to Office Action dated Jul. 6, 2012", 18 pgs.

"U.S. Appl. No. 12/090,845, Response Filed Feb. 7, 2014 to Non Final Office Action dated Dec. 19, 2013", 13 pgs.

"U.S. Appl. No. 12/090,845, Response filed Mar. 5, 2012 to Final Office Action dated Dec. 7, 2011", 22 pgs.

"U.S. Appl. No. 12/090,845, Second Preliminary Amendment filed Apr. 15, 2011", 25 pgs.

"U.S. Appl. No. 12/090,845, Response filed Feb. 10, 2014 to Non Final Office Action dated Dec. 19, 2013", 14 pgs.

"U.S. Appl. No. 12/090,845, Response filed Sep. 20, 2011 to Non Final Office Action dated Jun. 9, 2011", 24 pgs.

"U.S. Appl. No. 14/054,323, Non Final Office Action dated Feb. 27, 2014", 19 pgs.

"U.S. Appl. No. 14/054,323, Examiner Interview Summary dated May 27, 2014", 3 pgs.

"U.S. Appl. No. 14/054,323, Preliminary Amendment filed Jan. 31, 2014", 8 pgs.

"U.S. Appl. No. 14/054,323, Response filed May 27, 2014 to Non Final Office Action dated Feb. 27, 2014", 15 pgs.

"U.S. Appl. No. 14/055,994, Examiner Interview Summary dated May 13, 2014", 4 pgs.

"U.S. Appl. No. 14/055,994, Non Final Office Action dated Feb. 12, 2014", 20 pgs.

"U.S. Appl. No. 14/055,994, Preliminary Amendment filed Jan. 31, 2014", 7 pgs.

"U.S. Appl. No. 14/055,994, Response filed May 12, 2014 to Non Final Office Action dated Feb. 12, 2014", 17 pgs.

"Australian Application Serial No. 2006299381, First Examiner Report dated Aug. 9, 2011", 4 pgs.

"Australian Application Serial No. 2006299381, Response Sep. 28, 2012 to Office Action dated Aug. 9, 2011", 23 pgs.

"Australian Application Serial No. 2006299381, Response filed Jan. 15, 2013 to Office Action dated Oct. 26, 2012", 18 pgs.

"Australian Application Serial No. 2006299381, Subsequent Examiner Report dated Oct. 26, 2012", 3 pgs.

"Canadian Application Serial No. 2,624,753, Office Action dated Jan. 4, 2013", 4 pgs.

"Canadian Application Serial No. 2,624,753, Response filed Jul. 4, 2013 to Office Action dated Jan. 4, 2013", 21 pgs.

"Chinese Application Serial No. 200680045507.2, Notification of Decision to Grant dated Jun. 29, 2012", w/English translation, 9 pgs.

"Chinese Application Serial No. 200680045507.2, Office Action dated Mar. 9, 2011", w/English translation, 7 pgs.

"Chinese Application Serial No. 200680045507.2, Office Action dated Sep. 9, 2010", w/English translation, 9 pgs.

"Chinese Application Serial No. 200680045507.2, Office Action dated Dec. 2, 2011", w/English Translation, 6 pgs.

"Chinese Application Serial No. 200680045507.2, Office Action dated Aug. 31, 2011", w/ English translation, 6 pgs.

(56) References Cited

OTHER PUBLICATIONS

"Chinese Application Serial No. 200680045507.2, Response filed Jan. 6, 2012 to Office Action dated Dec. 2, 2011", w/English claims, 9 pgs.
"Chinese Application Serial No. 200680045507.2, Response filed Jan. 24, 2011 to Office Action dated Sep. 9, 2010", w/English claims, 15 pgs.
"Chinese Application Serial No. 200680045507.2, Response filed Jul. 22, 2011 to Office Action dated Mar. 9, 2011", w/English claims, 13 pgs.
"Chinese Application Serial No. 200680045507.2, Response filed Nov. 15, 2011 to Office Action dated Aug. 31, 2011", w/English claims, 9 pgs.
"Chinese Application Serial No. 201210343055.3, Office Action dated Sep. 17, 2013", w/English translation, 13 pgs.
"Chinese Application Serial No. 201210343055.3, Response filed Apr. 2, 2014 to Office Action dated Sep. 17, 2013", w/English claims, 22 pgs.
"Eurasian Application Serial No. 200870160, Decision to Grant dated Apr. 21, 2011", 2 pgs.
"Eurasian Application Serial No. 200870160, Office Action dated Nov. 6, 2009", 2 pgs.
"Eurasian Application Serial No. 200870160, Response filed Sep. 2, 2010", w/English claims, 16 pgs.
"Eurasian Application Serial No. 200870160, Search report dated Jun. 25, 2009", 4 pgs.
"European Application Serial No. 06816321.1, Communication pursuant to Rules 161 and 162 EPC dated May 21, 2008", 2 pgs.
"European Application Serial No. 06816321.1, Examination Notification Art. 94(3) dated Apr. 3, 2014", 5 pgs.
"European Application Serial No. 06816321.1, Extended European Search Report dated Dec. 3, 2012", 7 pgs.
"European Application Serial No. 06816321.1, Office Action dated Jul. 17, 2013", 6 pgs.
"European Application Serial No. 06816321.1, Response filed Nov. 28, 2013 to Office Action dated Jul. 17, 2013", 12 pgs.
"European Application Serial No. 06816321.1, Response filed Dec. 28, 2012 to Extended European Search Report dated Dec. 3, 2012", 22 pgs.
"German Application Serial No. 20 2006 021 057.1, Response filed May 2, 2012 to Office Action dated Feb. 28, 2012", w/English Claims, 83 pgs.
"India Application Serial No. 3143/DELNP/2008, Office Action dated Aug. 1, 2013", 2 pgs.
"International Application Serial No. PCT/US2006/038963, International Preliminary Report on Patentability dated Apr. 8, 2008", 4 pgs.
"International Application Serial No. PCT/US2006/038963, International Search Report dated Mar. 14, 2007", 1 pg.
"International Application Serial No. PCT/US2006/038963, Written Opinion dated Mar. 14, 2007", 3 pgs.
"Israel Application Serial No. 190607, Office Action dated Feb. 14, 2011", 1 Pg.
"Israel Application Serial No. 190607, Office Action Response filed Aug. 25, 2011 to Office Action dated Jan. 25, 2011", 3 pgs.
"Israeli Application Serial No. 190607, Office Action dated May 21, 2014", 2 pgs.
"Israeli Application Serial No. 190607, Response filed Apr. 2, 2013 to Office Action dated Sep. 27, 2012", English translation, 11 pgs.
"Japanese Application Serial No. 2008-534680, Amendment filed Apr. 10, 2012", with English translation, 6 Pgs.
"Japanese Application Serial No. 2008-534680, Notice of Allowance dated May 8, 2012", with English translation, 4 pgs.
"Japanese Application Serial No. 2008-534680, Office Action dated Jan. 17, 2012", with English translation of claims, 4 pgs.
"Japanese Application Serial No. 2008-534680, Office Action dated Feb. 22, 2011", with English translation of claims, 11 pgs.
"Japanese Application Serial No. 2008-534680, Response Filed Aug. 22, 2011 to Office Action dated Feb. 22, 2011", with English translation of claims, 73 pgs.
"Japanese Application Serial No. 2011-180840, Amendment filed May 8, 2012", w/English translation, 11 pgs.
"Japanese Application Serial No. 2011-180840, Appeal filed Apr. 10, 2014", w/English claims, 21 pgs.
"Japanese Application Serial No. 2011-180840, Office Action dated Jun. 18, 2013", w/English translation, 10 pgs.
"Japanese Application Serial No. 2011-180840, Office action dated Dec. 17, 2013", w/English translation, 6 pgs.
"Japanese Application Serial No. 2011-180840, Response filed Oct. 21, 2013 to Office Action dated Jun. 28, 2013", w/English translation of claims, 14 pgs.
"Mexican Application Serial No. MX/a/2008/004593, Office Action dated Dec. 17, 2013", 2 pgs.
"Mexican Application Serial No. MX/a/2008/004593, Response filed Apr. 24, 2014 to Office Action dated Dec. 17, 2013", 11 pgs.
"Mexican Application Serial No. MX/a/2008/004593, Response filed Aug. 5, 2013 to Office Action dated Jul. 4, 2013", w/English claims, 22 pgs.
"New Zealand Application Serial No. 567259, First Examiner Report dated Oct. 22, 2009", 2 pgs.
"New Zealand Application Serial No. 567259, Response filed Feb. 4, 2011 to First Examiner Report dated Oct. 22, 2009", 3 pgs.
"New Zealand Application Serial No. 567259, Response filed May 18, 2011 to Subsequent Examiner Report dated Feb. 22, 2011", 17 pgs.
"New Zealand Application Serial No. 567259, Subsequent Examiner Report dated Feb. 22, 2011", 2 pgs.
"New Zealand Application Serial No. 567259, Examiner Report dated Jun. 9, 2011", 2 pgs.
"New Zealand Application Serial No. 567259, Response filed Jun. 14, 2011 to Examiner Report dated Jun. 9, 2011", 4 pgs.
Akpinar, E., et al., "Single Layer drying behaviour of potato slices in a convective cyclone dryer and mathematical modeling", Energy Conversion and Management 44, (2003), 1689-1705.
Cai, Y., et al., "Deep-Fried Technique of Vacuum Low-Temperature for Hamimelon Crisp Slice,", Science and Technology of Food Industry, No. 6, (1998), 59-60.
Jeevitha, G. C, et al., "Electromagnetic Radiation-Based Dry Blanching of Red Bell Peppers: A Comparative Study", Journal of Food Process Engineering, 36(5), (Oct. 2013), 663-674.
Liu, D., et al., "Research on Apple Chips with Vacuum Low-Temperature Puff", Journal of Ningxia Agricultural College, 21(2), (Jun. 30, 2000), 85-87.
Ruiz, Rennie P, "Gravimetric Determination of Water by Drying and Weighing", Current Protocols in Food Analytical Chemistry, (2001), A1.1.1-A1.1.6.
Shahidi, Fereidoon, "Unit D1.1 Extraction and Measurement of Total Lipids", Current Protocols in Food Analytical Chemistry, John Wiley & Sons, (May 1, 2003), 11 pgs.
Zhe, W., et al., "Research on new low fat fried sweet potato chips", Food Science and Technology of Shandong, No. 4, (Apr. 30, 2001), 9-10.
U.S. Appl. No. 12/090,845, U.S. Pat. No 8,715,760, filed Jul. 6, 2009, Mehods of Making Snack Food Products and Products Made Thereby.
U.S. Appl. No. 14/054,323, filed Oct. 15, 2013, Methods of Making Snack Food Products and Products Made Thereby.
U.S. Appl. No. 14/055,994, filed Oct. 17, 2013, Methods of Making Snack Food Products and Products Made Thereby.
"U.S. Appl. No. 14/054,323, Supplemental Amendment dated Jun. 30, 2014", 5 pgs.
"U.S. Appl. No. 14/055,994, Preliminary Amendment dated Jun. 30, 2014", 11 pgs.
"Chinese Application Serial No. 201210343055.3, Office Action dated Jul. 3, 2014", w/English Translation, 37 pgs.
"European Application Serial No. 06816321.1, Response filed Jul. 30, 2014 to Office Action dated Apr. 3, 2014", 12 pgs.
"Indian Application Serial No. 3143/DELNP/2008, Response filed Jul. 4, 2014 to Office Action dated Aug. 1, 2013", 25 pgs.
"U.S. Appl. No. 14/054,323, Final Office Action dated Oct. 6, 2014", 15 pgs.
"U.S. Appl. No. 14/054,323, Notice of Allowance dated Nov. 10, 2014", 8 pgs.

(56) References Cited

OTHER PUBLICATIONS

"U.S. Appl. No. 14/055,994, Final Office Action dated Oct. 6, 2014", 26 pgs.
"U.S. Appl. No. 14/055,994, Notice of Allowance dated Nov. 7, 2014", 9 pgs.
"Israeli Application Serial No. 233409, Office Action dated Jun. 10, 2014", 2 pgs.
U.S. Appl. No. 14/816,784, U.S. Pat. No. 9,615,601, filed Aug. 3, 2015, Process for the Controlled Introduction of Oil Into Food Products.
U.S. Appl. No. 15/465,258, U.S. Pat. No. 9,839,231, filed Mar. 21, 2017, Process for the Controlled Introduction of Oil Into Food Products.
U.S. Appl. No. 15/808,707, filed Nov. 9, 2017, Process for the Controlled Introduction of Oil Into Food Products.
"U.S. Appl. No. 14/816,784, Final Office Action dated Jul. 11, 2016", 34 pgs.
"U.S. Appl. No. 14/816,784, Non-Final Office Action dated Nov. 25, 2015", 33 pgs.
"U.S. Appl. No. 14/816,784, Notice of Allowance dated Dec. 2, 2016", 8 pgs.
"U.S. Appl. No. 14/816,784, Response filed Feb. 25, 2016 to Non-Final Office Action dated Nov. 25, 2015", 15 pgs.
"U.S. Appl. No. 14/816,784, Response filed Sep. 12, 2016 to Non Final Office Action dated Jul. 11, 2016", 9 pgs.
"U.S. Appl. No. 14/816,784, Supplemental Amendment filed Apr. 7, 2016", 7 pgs.
"U.S. Appl. No. 15/465,258, Non Final Office Action dated May 2, 2017", 5 pgs.
"U.S. Appl. No. 15/465,258, Notice of Allowance dated Aug. 22, 2017", 8 pgs.
"U.S. Appl. No. 15/465,258, Response filed Jul. 26, 2017 to Non Final Office Action dated May 2, 2017", 6 pgs.
"Australian Application Serial No. 2013202969, Examiner's Report dated Nov. 21, 2014", 4 pgs.
"Australian Application Serial No. 2013202969, Response filed Jul. 20, 2015 to Examiner's Report dated Nov. 21, 2014", 29 pgs.
"Australian Application Serial No. 2015261665, First Examiner Report dated Jul. 6, 2016", 5 pgs.
"Australian Application Serial No. 2015261665, Response filed Mar. 15, 2017 to Subsequent Examiners Report dated Nov. 10, 2016", 13 pgs.
"Australian Application Serial No. 2015261665, Response filed Oct. 19, 2016 to First Examiner Report dated Jul. 6, 2016", 23 pgs.
"Australian Application Serial No. 2015261665, Subsequent Examiners Report dated Nov. 10, 2016", 3 pgs.
"Chinese Application Serial No. 201210343055.3, Office Action dated Jun. 24, 2015", w/ English Translation, 7 pgs.
"Chinese Application Serial No. 201210343055.3, Office Action dated Dec. 24, 2014", w/ english Translation, 19 pgs.
"Chinese Application Serial No. 201210343055.3, Response filed Sep. 17, 2014 to Office Action dated Jul. 3, 2014", with English translation of claims, 19 pgs.
"Chinese Application Serial No. 201210343055.3, Response filed Mar. 9, 2015 to Office Action dated Dec. 24, 2014", w/ English Claims, 11 pgs.
"Chinese Application Serial No. 201210343055.3, Response filed Sep. 14, 2015 to Office Action dated Jun. 24, 2015", w/ English Claims, 8 pgs.
"Chinese Application Serial No. 2015109752821, Voluntary Amendment filed Aug. 24, 2016", w/English Claims, 8 pgs.
"Crisp Coat UC", [Online] Retrieved from the Internet: <http://www.modernistpantry.com/crisp-coat-uc.html>, (Jun. 30, 2016).
"DynaShear™", ADMIX Advanced Mixing Technologies, (2001), 6 pgs.
"European Application Serial No. 06816321.1, Office Action dated Sep. 29, 2014", 3 pgs.
"European Application Serial No. 06816321.1, Response filed Nov. 28, 2014 to Office Action dated Sep. 29, 2014", 50 pgs.
"European Application Serial No. 15152470.9, Extended European Search Report dated Oct. 5, 2015", 6 pgs.
"European Application Serial No. 15152470.9, Invitation pursuant to Article 94(3) and Rule 71(1) EPC", 4 pgs.
"European Application Serial No. 15152470.9, Response filed May 25, 2016 to Office Action dated Nov. 30, 2015", 16 pgs.
"Indian Application Serial No. 3143/DELNP/2008, Response filed Jan. 6, 2015", 18 pgs.
"International Application Serial No. PCT/US2016/045415, International Preliminary Report on Patentability dated Feb. 15, 2018", 7 pgs.
"International Application Serial No. PCT/US2016/045415, International Search Report dated Oct. 10, 2016", 5 pgs.
"International Application Serial No. PCT/US2016/045415, Written Opinion dated Oct. 10, 2016", 5 pgs.
"Israel Application Serial No. 233409, Office Action dated Feb. 5, 2015", w/English Claims, 5 pgs.
"Israel Application Serial No. 233409, Response filed Jun. 7, 2015 to Office Action dated Feb. 5, 2015", w/ English Claims, 55 pgs.
"Israeli Application Serial No. 190607, Office Action dated Jun. 28, 2015", w/ English Claims, 6 pgs.
"Israeli Application Serial No. 190607, Response filed Aug. 18, 2015 to Office Action dated Jun. 28, 2015", w/ English Translation, 8 pgs.
"Japanese Application Serial No. 2013-218466, Office Action dated Jul. 28, 2015", w/ English Translation, 6 pgs.
"Japanese Application Serial No. 2013-218466, Office Action dated Dec. 24, 2014", w/ English Translation, 7 pgs.
"Japanese Application Serial No. 2013-218466, Response filed Apr. 13, 2015", with English translation of claims, 12 pgs.
"Japanese Application Serial No. 2013-218466, Response filed Oct. 19, 2015", with English translation of claims, 12 pgs.
"Mexican Application Serial No. MX/a/2014/007938, Response filed Mar. 8, 2017 to Office Action dated Jan. 20, 2017", w/English Claims, 15 pgs.
"Mexican Application Serial No. MX/a/2014/007938, Response filed Aug. 10, 2016 to Office Action dated Jun. 29, 2016", w/English Claims, 10 pgs.
"United Arab Emirates Application Serial No. P327/08, Office Action dated Feb. 20, 2017", in English, 10 pgs.
"U.S. Appl. No. 15/808,707, Non Final Office Action dated Jun. 21, 2018", 19 pgs.
"U.S. Appl. No. 15/808,707, Preliminary Amendment filed Mar. 20, 2018", 8 pgs.
"Canadian Application Serial No. 2,994,718, Examiner's Rule 30(2) Requisition mailed Mar. 1, 2019", 3 pgs.
"Chinese Application Serial No. 2015109752821, Office Action dated Jan. 3, 2019", w/ English translation, 19 pgs.
"European Application Serial No. 15152470.9, Invitation pursuant to Article 94(3) and Rule 71(1) EPC mailed Sep. 26, 2018", 5 pgs.
"Japanese Application Serial No. 2018-506175, Office Action dated Jan. 28, 2019", w/ English Translation, 9 pgs.
"United Arab Emirates Application Serial No. P327/08, Response filed Apr. 20, 2017 to Office Action dated Feb. 20, 2017", 22 pgs.
"U.S. Appl. No. 16/229,454, Preliminary Amendment filed Jul. 3, 2019", 8 pgs.
"Chinese Application Serial No. 2015109752821, Response filed Jul. 17, 2019 to Office Action dated Jan. 3, 2019", w/ English Claims, 12 pgs.
"Japanese Application Serial No. 2018-506175, Response filed Jul. 29, 2019 to Office Action dated Jan. 28, 2019", w/ English Claims, 16 pgs.

* cited by examiner

METHODS OF MAKING SNACK FOOD PRODUCTS AND PRODUCTS MADE THEREBY

PRIORITY APPLICATIONS

This application is a divisional application of and claims the benefit of priority to U.S. patent application Ser. No. 14/055,994, filed 17 Oct. 2013, which application is a continuation of U.S. patent application Ser. No. 14/054,323, filed Oct. 15, 2013, which is a continuation of U.S. patent application Ser. No. 12/090,845, filed on Jul. 6, 2009, which is a U.S. National Stage Filing under 35 U.S.C. 371 from International Application No. PCT/US2006/038963, filed Oct. 4, 2006, published in English as WO 2007/041679, which claims the benefit of priority under 35 U.S.C. 119(e) to U.S. Provisional Patent Ser. No. 60/723,880, filed Oct. 4, 2005, and to U.S. Provisional Application Ser. No. 60/820,743, filed Jul. 28, 2006, all of which are incorporated herein by reference in their entireties.

BACKGROUND OF THE INVENTION

The present invention relates generally to methods of making low-fat, fat free, or full-fat snack food products, and products made according to the method, in which food pieces are subjected to enzyme and/or cation treatment and/or specific cooking and/or drying techniques, to provide for snack food products having the texture, flavor, and other characteristics of conventional full-fat products.

Snack food products typically are made by frying sliced vegetable pieces in hot oil so that the moisture content of the sliced food pieces is reduced to a very low level and fat content is raised exponentially. Such products generally have a characteristic crispness that adds significantly to its organoleptic desirability. Fried potato or apple chips prepared using conventional methods generally have a fat content from about 30 percent to about 40 percent by weight, a percentage of fat that is considered by some to be unhealthy if these types of products are broadly substituted for low-fat foods and consumption is significant over time. While such products are accepted in the marketplace, consumers' desire to lower their fat consumption, limits this acceptance.

Furthermore, the conventional methods generally used, require these foods to be fried at high temperatures that can result in the production of potentially deleterious by-products. Reports of such by-products in recent years have led to general concerns about both fried and baked foods, especially those containing high amounts of fats and carbohydrates. Reports of acrylamide formation, generally in proportion to the degree of browning of foods high in fats and carbohydrates, have raised significant concerns within the food industry, the potential for harmful effects of this particular processing by-product.

To address some of these concerns, efforts have been made to reduce the amount of fat in such snack food products, and more recently, to find ways to minimize formation of potentially deleterious substances such as acrylamide and the like.

In recent years, "light" chips have been made using synthetic oils/fat that is substantially non-digestible and consequently non-absorbable by the human body, e.g. OLESTRA™. These products have received limited acceptance due in part to off-flavors perceived by some reports of detrimental gastrointestinal side effects and an FDA requirement of a warning label on such products, providing information that such fat substitutes may cause gastrointestinal side effects such as loose stools and abdominal cramping and/or the inhibition of absorption of some nutrients.

While products such as potato and apple chips are typically made using conventional frying methods, snack food products made with other nutritionally beneficial vegetables and fruits such as carrots, squash, parsnips, yuccas, pears, and the like have not successfully entered the market substantially due to the lack of proper processing methods.

There have been numerous efforts in the past to reduce the amount fat in snack foods such as potato chips, Roan (U.S. Pat. No. 4,058,631) discloses a method, of making fried food in which raw food product is treated with an aqueous solution of an enzyme, such as alpha amylase, for a period of time sufficient for the enzyme to penetrate and coat the surface of the food, and thereafter the food product is deep fried. Roan indicates that when the surface of a raw, starchy food product is coated with an aqueous solution of alpha amylase prior to frying, less fat is absorbed in the food during frying than occurs without the enzyme treatment, and the flavor of the fried food is improved.

Dreher at al (U.S. Pat. No. 4,756,916) discloses a process for producing low oil potato chips comprising washing potato slices with an aqueous solution, and applying oil to the washed slices to coat the slices with oil. The oil-coated slices are arranged as a monolayer on an endless conveyor belt, blanched at a temperature between about 160° F. and 212° F., and then baked at a high temperature of at least about 390° F. but below the smoke point of the oil, to partially dry the slices by reducing the aqueous moisture content of the slices to about 10-20% by weight. The partially dried slices then are further baked at a lower temperature of about 290°-320'F. to finish drying the slices by reducing the aqueous moisture content of the slices to about 2% by weight or less, to produce a product having an oil content of between about 10-25% by weight.

Laufer (U.S. Pat. No. 5,292,540) discloses a process for preparing potato chips comprising the steps of washing potatoes to remove foreign matter from the skin thereof, cutting the potato into thin slices, baking the slices for a period of about six to twelve minutes within a temperature range of about 250 to 500° F., and heating the slices in a microwave oven for about two to seven minutes.

Yamashita (U.S. Pat. No. 5,312,631) discloses a method for preventing cut pieces of agricultural products from sticking to each other during the steps of drying and cooking, which includes washing the cut pieces with, or immersing the same in, a solution of an amylolytic enzyme, or an acidic or alkaline aqueous solution. The cut pieces are blanched prior to enzyme treatment.

Zussman (U.S. Pat. No. 5,370,898) discloses a cooking process for food chip products that does not involve oil-based cooking. Food slices are washed with water to remove extractable surface starch, multi-layered, transported to an oven, and baked In a fluidized bed of hot air or steam. The baking process is a multi-step process, whereby the food slices are exposed to a higher pressure in a first zone for several minutes to ensure that the individual food pieces are separated. The pressure is then lowered in a second zone'for a second period of time. Similarly, in a third zone the pressure is reduced for a predetermined period of time to finish cooking the food products. Thereafter the chips are air-dried or finished in a dryer.

Lewis at al, (U.S. Pat. No. 5,441,758) discloses the preparation of low-fat or fat free potato chips or straws by a process comprising slicing potatoes to form slices or straws, blanching the sliced potato, and treating the slices during or after blanching with a high temperature amylase enzyme to prevent later sticking together of slices during processing, The slices are thereafter dehydrated to a moisture content of 12% to 30%, and thereafter toasted to about 2% moisture at a temperature of 140° C. to 220° C. The use of a high temperature amylase is required so that the enzyme remains effective during processing, and is not inactivated by the blanching step.

Petelle at al. (U.S. Pat. No. 5,470,600) discloses a method of making fat-free potato chips, by initially cooking potato slices in a three zone primary oven, by first radiant heating the slices and then subjecting the slices to two successive stages of forced air heating to reduce the moisture content of the slices to near a final moisture content. Petelle at al further discloses independently controlling the time duration in each of the three zones, simultaneously forcing the air into the top and bottom surfaces of the slices in the primary oven to a near final moisture content of about 15% by weight, independently controlling the time duration of the slices in the dielectric heater to a final moisture content of about 7% by weight using wavelengths of about 65.8 feet at a frequency of about 15 mhz, and allowing the slices to successively, increasingly pile up in the last two forced air stages and the dielectric heating stage.

Benson at al. (U.S. Pat. No. 5,603,973) discloses a process for making potato chips without the use of oil, wherein whole potatoes are cut into discrete slice pieces which are washed to remove starch or debris from the slice surfaces. The slices are arranged in a single layer and the surface water is removed from the slice surfaces by exposing them to blasts of air and suction. Alternatively, the slices may be washed in warm water at a temperature of about 130° F. to preheat them. The slices are transferred to a heated conveyor to enter an infrared zone for exposure to high intensity infrared energy for a short period of time, less than 25 seconds, effecting a blanching of the slices and quenching of naturally-occurring deleterious enzyme action. In a subsequent step, dry air is impinged upon the slices from above and below to reduce the water content below 35% by weight. The slices are accumulated in a multi-layer pack and dried in moving air until moisture content has been obtained to a level on the order of 0.5% to 2%.

Wiedersatz (U.S. Pat. No. 5,858,431) discloses a method for preparing fat-free snack chips, comprising preparing slices of raw food product, which are subjected to a high intensity air knife arrangement to remove surface moisture, then exposed to a hot air fluid bed impingement including multiple dual-zone hot air fluid bed impingement ovens operating under different predetermined conditions. In the preferred embodiment, the slices are exposed to two dual-zone hot air fluid bed impingement ovens, the first oven having a conveyor belt transporting slices through the oven at a speed of 2.5 to 3.0 feet per minute and operating at 500 to 525° F. (zone 1) and 450 to 500° F. (zone 2), and the second oven having a conveyor belt operating at a speed of 1.5 to 2.0 feet per second and at 350 to 400° F. (zone 1) and 300 to 350° F. (zone 2). The first impingement oven of the preferred embodiment removes approximately 50 to 60 per cent of the moisture in each slice, while the second impingement oven of the preferred embodiment removes approximately 20 to 35 per cent of the remaining moisture. The slices may then have oil and/or seasoning applied thereto, and are passed to a combination microwave and hot air dryer which removes entrained moisture without scorching the chips.

Xu et al. (U.S. Patent Publication No. 2002/0004085) discloses methods for producing a consumable product from potatoes, comprising: (a) treating a potato substance with an effective amount of one or more exogenous enzymes selected from the group consisting of an amyloglucosidase, glucose oxidase, laccase, lipase, maltogenic amylase, pectinase, pentosanase, protease, and transglutaminase, and (b) processing the enzyme-treated potato substance to produce a potato product. In one embodiment, blanching of the potato substance may occur prior to enzyme treatment. The processing step may include frying in oil or baking.

Despite the many advances in the processing of snacks and chips, there nevertheless remains a need for improvements to these products, and the processes for making them, characterized by improved crispness, mouth feel and flavor properties, reduction of fat content and overall improvement in nutritional profile, including minimization of exposure to conditions that can result in the formation of potentially deleterious-by-products, all resulting from processes that are feasible, efficient, manageable, and are practically and economically scaleable for production at output levels necessary for product commercialization in an adequately fuel efficient production environment. There also remains a need for eliminating the conventional deep frying processes that traditionally have been used for the production of full-fat and some reduced fat snack foods, and controlling the amount of fat in such products to provide a predetermined amount. Further, there remains a need for snack food products made from certain fruits vegetables, nuts, grains and the like, or the healthier versions of numerous currently available snack products, not previously feasible to make and the methods for their production.

SUMMARY OF THE INVENTION

A first embodiment of the present invention is directed to a method of making a snack food product comprising,
(a) providing a plurality of cut or shaped food pieces;
(b) exposing the food pieces to a solution comprising one or more enzymes to coat the surface thereof;
(c) thereafter blanching the plurality of food pieces for a time sufficient to inactivate any enzymes on the surface of the food pieces, wherein the food pieces have an initial moisture level after the blanching step; and
(d) reducing the initial moisture level to a final moisture level of bout about 10% by weight.

A second embodiment of the present invention is directed to a method of s eking a snack food product comprising,
(a) providing a plurality of cut or shaped food pieces;
(b) exposing the food pieces to a solution comprising one or more cations to coat the surface thereof;
(c) thereafter blanching the plurality of food pieces for a time sufficient to inactivate any enzymes on the surface of the food pieces, wherein the food pieces have an initial moisture level after the blanching step; and
(d) reducing the initial moisture level to a final moisture level of about to about 10% by weight.

A third embodiment of the present invention is directed to a method of making a snack food product comprising,
(a) providing a plurality of cut or shaped food pieces,
(b) blanching the plurality of food pieces for a time sufficient to inactivate any enzymes on the surface of the food pieces, wherein the food pieces have an initial moisture level after the blanching step; and
(c) reducing the initial moisture level to a final moisture level of about 0.5 to about 10% by weight by exposing the food pieces to a first moisture level reduction procedure which reduces the initial moisture level to an intermediate moisture level of about 10 to about 80% by weight, and thereafter exposing the food pieces to a second moisture Level reduction procedure which reduces the intermediate moisture level to the final moisture level The second moisture level reduction procedure, among other feasible procedures, may may Include frying the food pieces in an oil or oil substitute.

A fourth embodiment of the present invention is directed to a snack food product comprising cut or shaped food pieces, wherein each of the food pieces has a predetermined fat content of less than 1 to about 35% by weight, e.g., between 0.5 and 15% by weight an average force of fracture of less than or equal to 12 N, and an average Young's modulus of equal or greater than about 3.5 N/mm.

A fifth embodiment of the present invention directed to a method of making a snack food product comprising,
(a) providing a plurality of out or shaped food pieces;
(b) blanching the plurality of food pieces, wherein the food pieces have an initial moisture level after the blanching step; and
(c) reducing the initial moisture level to a final moisture level of about 0.5 to about 10% by weight by drying the food pieces in one step or multiple steps wherein at least one step is conducted in a rotary dryer, a fluidized bed dryer, a vibrating fluidized, bed dryer and the like or combinations thereof while controlling the temperature, air flow and movement of the food pieces to allow for even and constant exposure of the food pieces to heat.

A sixth embodiment of the present invention is directed to a method of making a snack food product comprising,
(a) providing a plurality of cut or shaped food pieces;
(b) blanching the plurality of food pieces, wherein the food pieces have an initial moisture level after the blanching step; and
(c) reducing the initial moisture level to an intermediate moisture level of about 10 to about 80% by weight while controlling the temperature, air flow and movement of the food pieces to allow for even and constant exposure of the food pieces to heat, and thereafter exposing the food pieces to a second moisture level reduction procedure which reduces the intermediate moisture level to the final moisture level.

A seventh embodiment of the present invention is directed to a method of making a snack food product comprising,
(a) providing a plurality of cut or shaped food pieces;
(b) thereafter blanching the plurality of food pieces for a time sufficient to inactivate any enzymes on the surface of the food pieces, wherein the food pieces have an initial moisture level after the blanching step; and
(c) reducing the initial moisture level to a final moisture level of about 0.5 to about 10% by weight in accordance with any of the aforementioned embodiments herein, either (i) without the application of a solution comprising enzymes or cations or (ii) by exposing the food pieces to a solution comprising at least a combination of one or more enzymes and one or more cations in any feasible manner to coat the surface thereof.

A frying step and/or a drying step using a vacuum dryer, a vacuum belt dryer, and the like can be inserted as a reducing step, preferably the final drying step, in any of the aforementioned embodiments.

An eighth embodiment of the present invention is snack food products made from vegetables, fruits, nuts, grains and other consumable ingredients, and any combination thereof, and the method of their production, where the commercial production of such snack foods, or the production of their healthier versions, were not previously feasible.

Additional features of the invention can be understood in reference to the accompanying descriptive matter in which there is illustrated and described preferred embodiments of the present invention.

DESCRIPTION OF THE PREFERRED EMBODIMENTS

In preferred embodiments, the present invention provides a snack food product processed in such a manner so as to provide a plurality of cut or shaped food pieces that have a taste, texture and/or appearance of conventionally produced products made by a process including a step in which the food pieces are fried in oil (typically at temperatures of greater than about 300° F.). Preferably, a snack food product prepared in accordance with the present invention has at least one, preferably at least three, preferably at least five, of the following attributes: a crisp texture, a fat content of less than about 0.5% by weight, a moisture content of greater than about 0.5% by weight, a ratio of percent by weight of moisture to percent by weight of fat of at least about 12, and the food pieces will fracture at less than or equal to about 12 N and have an average Young's modulus of equal to or greater than about 3.5 N/mm, in yet another preferred embodiment the present invention provides a snack food product and the method of its production and/or cooking processed in such a manner so as to provide a plurality of cut or shaped food pieces that (i) have a new and/or unique taste, texture and/or appearance, or (ii) have less fat and/or are considered as healthier versions of currently available products, or (iii) have been made from vegetables, fruits, grains, nuts, legumes or any other consumable ingredients and their combination thereof where the production of such products were not previously feasible due to lack proper production and/or cooking methods.

Surprisingly, the present invention has been found to retain the desired high quality, flavor, texture, appearance and consumer acceptability of high-fat snacks, through certain desirable treatment of the raw materials and subsequent cooking under conditions that eliminates, optionally minimizes, and/or controls the amount of contact with fats, such as oils or oil substitutes, and limit the potential for producing potentially deleterious by-products. Further, in contrast with known conventional frying methods, the food pieces may be infused with a predetermined amount of fat in a 'totally controlled environment' during the production process. In addition to being able to control the desired amount of fat being infused into the products of present invention to an exact amount, the present invention entirely eliminates the need for utilizing pools of hot oils or oil substitutes, and maintaining, filtering out, and, at last, in most cases, disposing of the related fats used in the production process. In addition, the present invention also eliminates the need for using defatters in the production of relevant low-fat snack food products.

The snack food products can comprise less than 0.5 wt-% fat, or can comprise between 0.5-15 wt-% fat, or up to about 35 wt-% fat.

The term "food pieces" is intended to include substantially any foods. Preferably, the food pieces may be provided as cut or shaped food pieces that can be shaped or reshaped directly from their raw state. These foods include potato, beet, pumpkin, squash, tomato, mushroom, zucchini, carrot, eggplant, apple, pear, bananas, berries, grains, beans, nuts, seeds, rutabaga, plantain, taro, okra, onion, parsnip, yam, sweet potato, yucca, papaya, mango, pineapple, and the like. These foods include pureed, sliced, diced, milled, grinded, powdered, or pulverized fruits, vegetables, legumes, grains, nuts, beans, seeds and the like, including products such as beans, rice, corn, wheat and the like. Singly or in combinations, the aforementioned products and ingredients can be manipulated to form sheets, slices or pieces of food composition through extrusion or sheeting of a prepared dough or mixture and the like. The dough or mixture thus formed then can be extruded or cut into any desired shapes. There are many variations on this basic procedure for manipulating flour or dough into a shape suitable for the present process. For example, see U.S. Pat. Nos. 3,800,193 (mixing corn flour with seasonings); 3,922,370 (mixing water, rice and rice flour); and 3,348,950 (mixing corn, sucrose, water, and, corn grits), each of which is hereby incorporated by reference. Generally, the process of the invention can be used with all foods that were heretofore fried or with foods that cannot tolerate the frying process. The format of the food can include, for example, sticks, strips, slices, chips, crinkle cut, waffles, flakes, and the like. Flaked products may be made into bars or cereals themselves or used as ingredients for granola, granola bars, or add-ins to yogurt, cereals, trail mixes, snack mixes, and the like.

For example, corn tortilla products or bean chips can be prepared initially by forming a composition from water and corn or bean flour, or alternatively cooked corn or beans, and cooked in conventional tortilla ovens. Tortilla or bean strips or rounds can be treated and processed using the current invention to produce fat free or low fat snack products that have a crispy texture and flavor of fried foods without frying in oil or oil substitutes. Generally, the process of the present invention can be used with all snack foods that have traditionally been fried in oil to achieve crisp texture and traditional fried flavor.

In another embodiment, the sheeted or extruded dough or mixture described herein can be made from a potato mixture or other starch material, alone or in combination with other ingredients, and then processed in accordance with the teachings of the present invention to a crispy finished product without frying.

Preferred food pieces are derived from fruits and/or vegetables that have a generally solid inner matrix that is exposed when sliced and demonstrates fracturability when a slice is bent. In a preferred embodiment, the food pieces are derived from potatoes such as those generally used to produce potato chips. In preferred embodiments, the food pieces comprise a potato substrate. The potato substrate may simply be farm-grown potatoes (e.g. raw potatoes) of any variety. Such varieties include, but are not limited to, Bintje, Russet Burbank, Yukon Gold, Kennebec, Norchip, Atlantic, Shepody, Sebago, Red Pontiac, Red Warta, Irish Cobbler "BC", Norgold Russet "BC", Norland, Atlantic, White Rose, Superior, Centennial Russet, Keswick "NB 1", Green Mountain, La Soda, Red La Rouge, Red Nordland, Red Bliss, Yellow Finnish, Ruby Crescent, and Australian Crescent, Russian Blue, Peruvian Blue, Superior, Katandin, and sweet potato varieties such as Beauregard, Jewel, Nemagold, Centennial, Excel, Regal, Southern Delite (Hernandez, Vardaman, Travis, White Delight, Sumor, Nancy Hall, Picadita, Campeon, Star Leaf/Boniato, Japanese, Chinese, and Okinawan Purple and the like.

In accordance with first and/or second embodiments of the invention, a method is provided for making a snack food product, comprising,
  (a) providing a plurality of cut or shaped food pieces;
  (b) exposing the food pieces to a solution comprising one or more enzymes and/or one or more cations to coat the surface thereof;
  (c) thereafter blanching the plurality of food pieces for a time sufficient to inactivate any enzymes on the surface of the food pieces, wherein the food pieces have an initial moisture level after the blanching step; and
  (d) reducing the initial moisture level to a final moisture level of from about 0.2 to about 10% by weight. In accordance with additional embodiments, the final moisture level is preferably from about 0.5 to about 5.0% by weight.

An intermediate moisture level of about 10 to about 80% by weight, preferably about 10 to about 50% by weight, more preferably about 15 to about 35% by weight, may be achieved with a number of the embodiments of the present invention. Thereafter, the food pieces are exposed to a second moisture level reduction procedure which reduces the intermediate moisture level to the final moisture level. The intermediate and the final drying steps may further be broken down to, sub steps, or alternatively combined into one step.

Suitable enzymes, forms taken by the enzymes, commercial availability, etc. for use in accordance with the present invention are chosen from one or more of the enzymes listed in U.S. Pat. Nos. 4,058,631; 5,312,631; and 7,056,544, each of which is incorporated by reference herein. Preferably, the enzyme is other than a high-temperature enzyme, such as the high temperature amylase described in U.S. Pat. No. 5,441,758. However, under certain circumstances, such an enzyme may be used in accordance with the invention, and the use of a high temperature enzyme is not disclaimed herein. Preferred enzymes in accordance with the present invention include amylase, cellulose, invertase, pectinase and amyloglucosidase, with amylase being the most preferred. Preferably, the one or more enzymes is present in the solution at a concentration of about 0.1 to about 5% by weight.

In accordance with the invention, the enzyme solution may further comprise one or more cations, or the cations can be provided in a solution without enzymes. The term "cation-producing compound" is intended to include compounds in which cations are produced in solution via dissociation of the cation with an anion, either at ambient temperatures or with the addition of heat. Suitable cation-producing compounds in accordance with the present invention include, but are not limited to, alkali metal salts, such as lithium, sodium and/or potassium salts: alkaline earth metal salts, such as magnesium and/or calcium salts; aluminum compounds; and group VA metal compounds, such as nitrogen, phosphorous and/or bismuth compounds (e.g., ammonium). More preferred from this set of compounds are calcium salts, magnesium salts, potassium salts, aluminum compounds and nitrogen compounds, with calcium salts being the most preferred. Preferably, the one or more cation is present in the solution at a concentration of from about 0.1 to about 5% by weight, more preferably from about 0.2 to about 2.5% by weight.

The exposure of the food pieces to the enzyme solution, optionally including cations as described above, or the cation solution without enzymes, provides various improved properties to the snack food product. The term "improved property" is defined herein as any property of a snack food product that is altered, by the action of the one or more enzymes and/or cations relative to a snack food product in which the food pieces are not treated with such a solution, The improved property may include, but is not limited to, increased crispiness, reduced stickiness, increased firmness of the, raw and/or blanched material, reduced browning from enzymatic and/or Maillard reactions, increased color brightening, increased color retention, increased color enhancement, reduced color fading, increased stiffness, increased rugged or smooth appearance, improved flavor, and reduced fat content. Many of these terms are defined more fully in U.S. Pat. No. 7,056,544, hereby incorporated by reference. The other terms are defined in accordance with their customary meaning as would be apparent to those of ordinary skill in the art.

It will be appreciated that crispness and/or stiffness can be increased in a measured way, so that, for instance, if a certain crispness or a certain stiffness is desired to achieve certain processing goals or for producing a certain finished snack food product, crispness or stiffness can be controlled by varying the amount of exposure to the one or more enzymes and/or cations.

The improved property may be determined by comparison of a snack food product prepared in accordance with the methods of the present invention, versus a snack food product prepared in accordance with prior art methods. Techniques for determining such improved properties achieved by use of the present methods are described herein. Organoleptic qualities may be evaluated using procedures well established in the food industry, and may include, for example, the use of a trained panel of sensory evaluators. Other methods could include texture analysis and comparisons such as those disclosed herein below.

Preferably, the food pieces are exposed to the enzyme solution (with or without cations), or the cation solution, for a time of about 0.5 to about 45 minutes, more preferably about 0.5 to 15 minutes, most preferably about 0.5 to about 5 minutes.

In alternative embodiments, other nutrients including vitamins and minerals, such as Vitamin A, Vitamin, B6, Vitamin B12, Vitamin C, Vitamin D, Thiamin, Riboflavin, Niacin, Folic Acid, Phosphorous, Magnesium, Copper, Calcium, Zinc. Iron and the like can be added to the products of present invention either by infusing such vitamins and minerals into the food pieces in the enzyme treatment, cation treatment. and/or blanching process, or in an additional step or by spraying a compound including any desired vitamins and/or minerals over the food pieces prior to or after cooking. This procedure results in a product that is nutritionally fortified and provides an opportunity to make snack food products that are healthier. In alternate embodiments, flavor enhancers and seasoning blends such as salt (NaCl), sugar herb extracts, fruit extracts, vegetable extracts and the like or a combination thereof can be infused into the snack food product by steeping or soaking the cut food pieces with the respective salt, sugar, herbs, fruits, vegetables and the like, thereby incorporating these flavoring components into the food pieces either'in the blanch water and/or by having a separate step following or prior to the blanching step in which flavors are fused into the cut food pieces. Alternately, cut food pieces may be soaked in concentrated flavor extracts that are either aqueous or otherwise, In yet another embodiment, the snack food products of the present invention may be coated with chocolate, caramel, syrups, and coatings made from fruits or vegetables or any other similar covering, thereby creating other novel gourmet snacks that are free of, or alternatively low or high in fat.

If preferred, any predetermined amount of digestible and/or synthetic fat, such as an oil or oil substitute, may be added to and/or blended and mixed with the dough or mixture prior to cooking or alternatively can be applied in any process such as spraying on the food pieces, prior to, during, or after the pre-cooking step. Preferably, the oil is a cooking oil not containing fatty acids such as canola, sunflower or safflower oils, which may be applied to the vegetable pieces by either spraying the oil onto the food pieces or by flash soaking the food pieces in oil or by any other feasible method, such as applying to the blanch water or spraying onto a conveyer belt or a tray before and/or after food pieces are placed onto such tray or belt. In alternate embodiments where oil is used, although any food grade oil or oil substitute can be used, the preferred oils will be unrefined oils and those having a low smoke point, preferably extra virgin olive oil, hemp seed oil, walnut oil, sesame oil, flaxseed oil, coconut oil, unrefined canola oil, semi-refined canola oil, unrefined peanut oil, safflower oil, sunflower oil, high-oleic sunflower oil, unrefined corn oil, soy oil, unrefined soy oil, unrefined sesame oil, flavor infused oils, emulsified vegetable shortening, and the like, synthetic oils such as OLESTRA™ and the like. Alternative oils that offer health benefits, such as SMART BALANCE™, ENOVA™ and the like, may be used either alone or in combination with other natural or synthetic oils such as those discussed above.

Food Piece Preparation. The food pieces are cut, formed or shaped, from one or a combination of food materials. For raw vegetables or raw plant materials, the food pieces are preferably cleaned, optionally peeled, and cut. Preferred vegetables such as potatoes, vegetables, fruit, or other food products are preferably cut into slices, sticks or strips of a desirable size and shape for chips, sticks, shoestrings, wavy cut chips, crinkle cut chips, waffle cut chips, straight cut chips and sticks and the like. After cutting, forming or shaping, the prepared food pieces are preferably contacted with an aqueous solution, such as a water, to remove free starch. Removing the free starch is best for optimizing use and reducing the amount of enzyme, plus free starch can leave a powdery appearance after drying the chip.

Enzyme and/or Cation Treatment: The prepared food pieces may be exposed to an enzyme solution or a cation solution, more preferably an enzyme and cation solution. When enzyme treatment is performed, the enzymes are preferably used in amounts that contribute to one or more of the improved properties as defined herein and/or provide at, least one of the following advantages: increasing the crispness, reducing the stickiness and improving color of finished products. Without being bound by theory, it is believed that the optional cations increase the activity of the enzymes, reducing time in the solution, and also make the cut food pieces more firm or rigid so they are easier to process. Further, cations may also decrease enzymatic browning as well as contribute to the snack food product's nutritional profile.

The appropriate exposure to a given enzyme or cation for improving a specific property or properties of a snack food product will depend on the enzyme or cation in question. The skilled person may determine a suitable enzyme or cation exposure on the basis of methods known in the art. Where both enzyme and cation treatments are performed, the treatments are preferably carried out simultaneously using a single solution, although the treatments may also be performed separately using an enzyme solution followed by a cation solution, or a cation solution followed by an enzyme solution. Salts and/or flavoring ingredients can also be added to any of the solutions.

The enzymes to be used in the methods of the present invention may be in airy form suitable for the use in question, e.g., in the form of a dry powder, agglomerated powder, or granulate, in particular a non-dusting granulate, a liquid, in particular a stabilized liquid, or a protected enzyme. Granulates and agglomerated powders may be prepared by conventional methods, e.g., by spraying the enzyme(s) onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy, The enzymes may be contained in slow-release formulations. Methods for preparing slow-release formulations are well known in the art. Liquid enzyme preparations may, for instance, be stabilized by adding nutritionally acceptable stabilizers such as a sugar, a sugar alcohol or another polyol, and/or lactic acid or another organic acid according to established methods.

In preferred embodiments the enzyme and/or cation treatment is applied prior to blanching. In alternative embodiments, the enzyme and/or cation treatment is applied concurrently during the blanching, or as an additional treatment after blanching. In the case of certain shaped food pieces such as sheeted products that are made from a combination of food materials or a dough, the enzyme and/or cation treatment may be applied after the shaped food pieces have been through the initial baking step that is customary in production of such products.

Blanching. Several embodiments of the present invention include a step whereby the food pieces are blanched. Preferably, the food pieces are blanched for a time period sufficient to achieve any of the following: 1) to inactivate any enzymes that naturally occur on the surface of the pieces and/or to inactivate any enzymes added during the enzyme treatment step described above; 2) to gelatinize at least a portion of the naturally occurring starches; 3) to remove excess free sugars so as to reduce Maillard browning and potential for formation of acrylamides; and 4) to improve texture and flavor. Typically, the food pieces are preferably blanched by immersion in an aqueous solution, preferably containing from about 0.1-5%, e.g., about 0.5% to about 8% by weight, more preferably from about 2% to about 5% by weight, most preferably about 3% by weight of one or more cations, as defined above, In preferred embodiments, the cations are selected from NaCl, KCl, $MgCl_2$ and $CaCl_2$. The blanching may be conducted at a temperature of preferably from about 60° C. to about 120° C., more preferably from about 70° C. to about 100° C. In alternate embodiments, the blanching may be conducted by exposure to steam (at ambient or higher pressures), preferably for about 15 seconds to about 10 minutes, more preferably for about 40 seconds to about 3 minutes, depending upon the amount of blanching desired. Alternatively, any known method of blanching such as microwave, Ohmic heating, super heat steam, infrared heating and the like can be used in accordance with the present invention.

If necessary, the food pieces are then preferably drained or conveyed under an air curtain to remove excess water. In alternate embodiments, any known method of removing excess surface water may be employed. Salt can be added before, during or after blanching. Any salts that are suitable for use in foods may be used, but NaCl, KCl, $MgCl_2$, $CaCl_2$ and the like are preferred.

The blanching step may not be applicable and/or necessary in cases of certain shaped food pieces such as sheeted products that are made from a combination of food materials or a dough.

Reducing Moisture Level. The moisture in the food pieces is preferably reduced to a final moisture level of about 0.5 to about 10% by weight, preferably about 0.5 to about 5% by weight. This moisture reduction may be achieved in a number of different ways.

In further embodiments of the present invention, processing steps conducted in a variety of different cooking, heating and cooling devices may be used to accomplish the same or similar drying and cooking tasks. For example, the following devices may be employed: (1) Initial rotary drum dryer followed by impingement, fluidized bed, aero pulse or Ohmic heat dryer; (2) Initial fluidized bed dryer followed by final fluidized bed multi layer or impingement multi layer; (3) Initial super steam blanch followed by any of impingement, fluidized bed, rotary drum, microwave, infrared, Ohmic heat, tray, conviction or any other dryer; (4) Single step dryer using any of the above mentioned equipment; (5) Double or possibly triple step drying using any combination of the above mentioned equipment in any order.

In preferred embodiments, immediately following the blanching of sliced food pieces with high energy, intense radiant heat, the sliced food pieces are preferably cooked in rapidly moving streams of hot air issuing from rows of multiple impingement jets arranged above and below the conveyor belt. In preferred embodiments, the impingement of the air upon the sliced food pieces will be at the velocity of about 3,000 to about 8,000 feet per minute (fpm), preferably 4,000 fpm being one satisfactory rate at a temperature of from about 300 to about 450 degrees F. The sliced food pieces are preferably maintained confined against airborne movement in the dry air impingement stage for a period of time ranging from about 30 to 90 seconds. A substantial amount of moisture is removed from the sliced food pieces by the fast-moving hot, dry air and at the end of the step the sliced food pieces have approximately about 10 to about 35% moisture content, ideally, about about 25% to about 35%.

In one embodiment of the invention, the moisture reduction step includes cooking the food pieces in one or more dryers or ovens independently selected from the group consisting of forced air convection ovens, fluidized bed dryers/ovens, vibrating fluidized bed dryers/ovens, impingement dryers/ovens, pulsed fluidized bed dryers/ovens (e.g., Aero Pulse dryers), rotary dryers/ovens, rotary drum dryers/ovens, rotary spiral drum dryers/ovens, tray ovens, stationary dryers/ovens, spiral roasters/dryers (such as, for example, FMC Spiral Roto-Louvre Roaster/Dryers), microwave dryers/ovens, infrared dryers/ovens, super heat airless driers, vacuum driers, vacuum belt dryers and ohmic dryers, or any similar drying/cooking apparatus.

In one embodiment, the food pieces <are cooked for about 0.5 to about 40 minutes at temperature of from about 160° F. to about 400° F., more preferably from about 275° F. to about 325° F.

In another embodiment of the invention, the moisture reduction comprises bringing the food pieces to a first temperature for a first time period, and thereafter bringing the food pieces to a second temperature for a second time period. Preferably, bringing the food pieces to the first temperature for the first time period, such as but not limited to a temperature of about 160° F. to about 400° F., preferably between about 275° F. to about 375° F. for a time of about 0.5 to about 40 minutes, reduces the initial moisture level to an intermediate moisture level of about 10 to about 80% by weight, and bringing the food pieces to the second temperature, for the second time period, such as but not limited to a temperature of about 160° F. to about 375° F., preferably between about 275° F. and about 350° F., and mare preferably between about 300° F. to about 325° F. for a time of about 4 to about 35 minutes, preferably about 5 to about 12 minutes and more preferably about 6 to about 11 minutes, reduces the intermediate moisture level to the final moisture level of about 0.5 to about 10%. In preferred embodiments, the second temperature is lower than the first temperature.

In other preferred embodiments, the first stage of the process comprises drying the food pieces in a rotary dryer, rotary drum dryer, rotary spiral drum dryer, fluidized bed dryer/oven or'vibrating fluidized bed dryer/oven to remove up to about 30% by weight, preferably up to about 50% by weight, and most preferably up to about 90% by weight of the initial moisture, and thereafter the second stage reduces the moisture level to the final moisture level of about 0.5 to about 10%. Preferably, the drying step is conducted a temperature of about 160° F. to about 400° F., more preferably from about 275° F. to about 350° F., and even more preferably from about 300° F. to about 325° F., for a time of about 2 to about 40 minutes, more preferably from about 5 to about 25 minutes, and even more preferably from about 6 minutes to about 18 minutes.

In preferred embodiments, the pretreated cut food pieces of the present invention are preferably dehydrated using a rotary dryer or rotary drum dryer, or rotary spiral drum dryer or any similar apparatus at a temperature preferably ranging from about 200 to about 390 degrees F., more preferably from about 275 to about 350 degrees F. and even more preferably from about 300 to about 325 degrees F. for a time interval of preferably from about 2 to about 20 minutes, more preferably from about 5 to about 15 minutes and even more preferably from about 8 minutes to about 12 minutes prior to further cooking in an impingement oven/dryer, fluidized bed oven/dryer (including their vibratory versions), microwave oven/dryer, aero pulse oven/dryer, conviction oven/dryer, tray oven/dryer, stationary oven/dryer, continuous belt oven/dryer of any type or the like. Alternatively, in yet another preferred embodiment of the present invention, a fluidized bed oven/dryer (such as, for example, those available from The Witte Company, or the Carrier Vibrating Equipment, Inc. or the like) may be used in the process of pre drying (dehydrating) of the products on the present invention in place of a rotary dryer of any type, as described above. In yet another embodiment of the present invention, the entire drying or dehydrating process may be achieved by using a fluidized bed oven/dryer (or a set thereof) such as those mentioned above.

Another embodiment of the present invention is to use an apparatus such as a rotary dryer or a rotary drum dryer for removing a significant amount of moisture (i.e., about 5%, preferably about 10%, more preferably up to about 30%, even more preferably up to about 50%, and most preferably up to about 80% or more) from the pre-treated cut food pieces. It is believed that drum dryers cause impairment (i.e., breakage, splintering, rupture and distortion) to the cut food pieces such as chipping potatoes. Further, it is believed that running such cut food pieces through a drum dryer will result in uneven drying, discoloration, and other damage to the cut food pieces. The production trails conducted on such equipment (i.e., Spray Dynamics Drum Dryer) using cut food pieces not prepared in accordance with the present invention confirmed the above mentioned beliefs.

In preferred embodiments, the partially dehydrated cut food pieces are then transferred to an impingement oven, a fluidized bed dryer/oven or any other similar equipment via a conveyor belt or any other conveying device or method. The partially dehydrated cut food pieces are then cooked at temperatures between about 225° F. and about 375° F. and preferably at temperatures between about 275° F. and about 350° F. and more preferably at temperatures between about 300° F. to about 325° F. for a period of about 4 to about 15 minutes and preferably for a period of about 6 to about 12 minutes and more preferably for a period of about 8 to about 10 minutes. The resultant snack food products may then be cooled and optionally seasoned as desired and packaged for distribution and consumption.

In still other preferred embodiments, the reduction of the moisture level to the final moisture level of about 0.5 to about 10% may be accomplished solely using a rotary dryer, rotary drum dryer, rotary spiral drum dryer, fluidized bed dryer/oven or vibrating fluidized bed dryer/oven, in one or more drying steps. No additional cooking procedure is utilized in this embodiment. Generally the same temperature and time conditions indicated above may be used in such an embodiment, over one or more stages.

Another embodiment of the present invention is drying/cooking with the use of spiral roasters/dryers. The drying principles and product behavior for this method closely mirror rotary ovens and rotary drum drying, except the internal spiral allows for precise control of drying time within the vessel. Typically, in spiral roaster/dryers he drying air entry into the product bed between the spiral flights is through the perforated plate or screen wrapped around the flights. Precise control of drying time within the vessel combined with the use of this method will result in a higher product quality, process effectiveness and added process efficiencies and output levels not experienced or expected previously.

During any of the stages, the food pieces may be exposed to air at an air speed of from about 200 to about 15,000 feet per minute. According to additional, alternative embodiments of the present invention, even lower air velocities may be used depending on the food pieces being prepared and/or the equipment being used. The process is further controlled by selectively increasing and/or decreasing the air speed to control the exposure of the product to temperature and airflow, thereby optimizing the quality of the finished product. Sequential adjustments to temperature and airflow allow for a controlled drying process that beneficially maintains the product temperature below temperatures that cause browning and carmelization until the product reaches a target moisture content. Manipulation of the different zones of temperature and air velocity allow for optimization of the texture, color, and flavor, as well as economical efficiency of the process.

Other equipment, such as, for example, any similar type rotary dryer or rotary drum dryer, "flash dryers", airless or superheated steam dryer and the like such as, for example, those available from Applied Chemical Technologies, Carrier Vibrating, Inc., The Dupps Company and the like, may be used in place of the dryers. Alternatively, microwave, infrared, impingement, vibrating impingement, tray oven, convection oven, stationary oven, fluidized bed or vibrating fluidized bed drying, vacuum drying, vacuum belt drying or the like can be employed in the process of partially or completely dehydrating the cut food pieces, each resulting in a different degree of efficiency and level of output. The use of a steam blancher, such as those available from the Lyco Company, alone or in combination with any of the foregoing equipments, provide numerous additional alternatives for either a partial or complete dehydrating process. When applicable, any versions of the foregoing equipment described herein in relation to the various embodiments of the present invention, such as, for instances, batch or continuous processing equipment, static or vibrating equipment designs and the like may be employed.

In further embodiments, the process resulted in a moisture loss from about 89% at the start to as low as about 50% moisture in the blanched slices. When applicable, any versions of the foregoing equipment described herein in relation to the various embodiments of the present invention, such as, for instances, batch or continuous processing equipment, static or vibrating equipment designs and the like may be employed.

Moisture sensing equipment such as those available from Drying Technologies, Inc. (i.e., DTI 500, DTI 5000) and the like can be installed inside the rotary dryer or the like to ensure proper drying conditions on an automated basis.

In preferred embodiments, the partially dried food pieces are then transferred to an impingement oven, a fluidized bed dryer/oven, a vibrating fluidized bed dryer/oven, a vacuum belt dryer/oven or any other similar equipment via a conveyor belt or any other conveying device or method. After moisture reduction, the resultant snack food products may then be cooled either at ambient or reduced temperatures, and optionally seasoned and/or coated as desired and packaged for distribution and consumption.

In further embodiments of the present invention, processing steps conducted in a variety of different cooking, heating and cooling devices may be used to accomplish the same or similar drying and cooking tasks. For example, the following devices may be employed: (1) Initial rotary drum dryer followed by impingement, fluidized bed, aero pulse or Ohmic heat dryer; (2) Initial fluidized bed dryer followed by final fluidized bed multi layer or impingement multi layer; (3) Initial super steam blanch followed by any of impingement, fluidized bed, rotary drum, microwave, inferred, Ohmic heat, tray, conviction or any other dryer; (4) Single step dryer using any of the above mentioned equipment; (5) Double or possibly triple step drying using any combination of the above mentioned equipment in any order.

Optional seasoning blends can be applied to products preferably using adhesives such as gums, starches, proteins, that can be used to create a sticky surface on the products for adherence of the seasoning blends as is generally known within the food industry.

To obtain a blistered effect on the product surface similar to the typical appearance observed when foods are fried, the food pieces are preferably cooked at a temperature or at least 265° F. after about halfway through the moisture removal. Next, the food pieces are cooked at a temperature of about 310° F. with a high velocity air flow (e.g., an air speed of about 500 to about 15,000 feet per minute) to achieve a final moisture content of about 2 to about 5%. The final drying when using certain types of equipment such as a vacuum dryer may take place at temperatures below those indicated above.

The process efficiency can be further improved by, after the moisture reduction is complete, running the food pieces through an "Equilibrator" system, that takes the hot product, exhausts the air from it, pulling off the heat thereby cooling it as the final moisture is removed.

The invention also contemplates reducing the moisture level down to the intermediate moisture level by any of the methods described herein, cooling and storing the moist product at ambient, refrigeration or freezer conditions, then subsequently frying, drying or baking the product to achieve the final moisture level. Alternatively, the frying step may immediately follow the steps of reducing the moisture level down to the intermediate moisture level.

In addition, the invention contemplates flash frying or baking any of the snack food products prepared in accordance with the invention, either in a commercial or retail setting or at home.

The present invention also includes snack food products made by any of the methods described herein.

Other aspects and advantages of the present invention will be understood upon consideration of the following illustrative and comparative examples.

EXAMPLE 1

Potato Chips: Approximately 2,333 grams of Yukon Gold variety potatoes were washed, then sliced to an average slice thickness of 1.90 mm, yielding approximately 2288 grams of sliced potatoes. The sliced potatoes were rinsed for 16 seconds in cold water (18° C./65° F.) and drained. The drained potato slices were placed in a solution of 0.5% amylase (American Labs, Inc. Fungal Amylase-100,000 SKB/gram Lot ALI00517-04) and 1% aqueous Calcium Chloride (32% aqueous solution Calcium Chloride from DSM Food Specialties) and held for 3 minutes before draining. After draining, the treated potato slices were blanched in 93° C. (200 degrees F.) water containing 3% salt (NaCl) (Cargill Top Flow Salt) for 1 minute. Blanched potato slices were dipped into cold water for about 15 seconds to halt cooking, then drained. The potato slices were then placed directly on a conveyor belt of an impingement oven (Impinger ® I, Model No. 1240 from Lincoln Food Service Products, Inc., Fort Wayne, Ind.) set at 140° C./285° F. and belt time of 13.25 minutes. After drying, the potato chips were allowed to cool completely, then placed in moisture proof bags and sealed. The total yield was 467 grams of potato chips. The resulting chips were observed visually and determined to have a light golden color, a good potato chip flavor and a crisp light texture.

Samples were analyzed for moisture using the convection oven method; by measuring the weight lost as a result of heating a ground sample (4 grams, run in triplicate) in a convection oven under controlled conditions (100° C. for 24 hours). The percent of weight lost was reported as the percent of moisture in the sample. in this example, the final moisture content was 4.42%.

Samples were analyzed for fat using the chloroform extraction method of F. I. Shahii (see reference provided below) with minor variations:

Prior to extraction, the sample is ground in a blender.
1. Prepare a 2:1 solution of chloroform: methanol.
2. Measure 10 g of ground sample into flask; add 50 mls of 2:1 chloroform/methanol solution.
Stir covered for 1 hour.
Pour into a clean flask through filter paper.
5. Rinse the initial flask and remaining solids into the flew flask with a small amount of the 2:1 solution of chloroform: methanol.
6. Add 30-35 mls of distilled water and mix.
7. Let sit at 4° C. overnight.
8. Remove settled top layer containing water and methanol with a water aspirator and glass pipette.
9. Weigh a new round bottom flask and record.
10. Pour the remaining solution into the new flask through a filter, pass the remaining layer of chloroform (and fat) over sodium sulfate to remove any remaining water. Wash all of the fat into the flask using additional chloroform.
11. Using a rotovap at 50° C./80 rpm, remove (by evaporation) the remaining chloroform.
12. Place flask in the chemical fume hood overnight o completely evaporate any remaining chloroform.
13. Weigh flask after drying is complete, record and determine the amount of fat.

The results indicated that the samples contained an average of about 0.30% fat. The average final thickness of the sample chips after drying was determined to be 1.38 mm by measuring thickness of 10 chips using digital calipers.

The "chloroform method" is based upon the method disclosed by F. I. Shahii, "Extraction and Measurement of Total Lipids", *Current Protocols in Food Analytical Chemistry* John Wiley and Sons, 2003, pp D1.1.4.

The "moist re method" is based upon the method disclosed by R. P. Ruts, "Gravimetric Determination of Water by Drying and Weighing: Measuring Moisture using a Convection Oven", *Current Protocols in Food Analytical Chemistry*, John Wiley and Sons, 2003, pp A1.1.1.

the step the sliced food pieces have approximately about 10 to about 35% moisture content, ideally, about about 25% to about 35%. Because of the high velocity of the moving impinged air, the sliced food pieces tend to scatter during this second stage of moisture removal and to ensure that the sliced food pieces are maintained in a mono layer, an upper conveyor belt of woven wire construction preferably moves at a distance of about 0.25 to about 0.5 inches above the carrying conveyor belt to serve as a containment belt or member. The arrangement of the conveyors will be explained in more detail below.

TABLE 1

Comparison of Chip Attributes.

| Sample | Fat g./oz. | Percent Fat | Percent Moisture | Average Thickness (mm) | Texture Analysis Grams of force | Ratio of % Moisture to % Fat |
|---|---|---|---|---|---|---|
| Test Product | 0.084 | 0.30%* | 4.42% | 1.38 | 379.87 | 14.73 |
| LAYS ® Classic | 10** | 35.71%** | 3.80% | 1.44 | 254.23 | 0.11 |
| LAYS ® Light (Contains Olestra ™) | 0** | 0%** | 3.45% | 1.40 | 345.59 | 0 |
| Lightly Salted Kettle Chips | 8** | 28.57%** | 4.26% | 1.30 | 583.87 | 0.15 |
| Low Fat Kettle Krisps | 1.5** | 5.36% | 4.99% | 1.55 | 416.06 | 0.93 |
| Terra Yukon Gold ™ | 6** | 21.42%** | 6.27% | 2.15 | 1090.40 | 0.29 |

*Fat analysis by Chloroform Extraction Method
**Information from Nutritional Label The texture of the potato chips was evaluated using a TA.XT2 Texture Analyzer using a 0.25" diameter ball probe and a chip/cracker fixture. Individual chips were rested over the 18 mm diameter opening on the plate's cylindrical opening, and were punctured with the ball probe. The ball probe traveled at 4.0 mm/s until a force of 10 grams was detected; then the ball probe was punctured through the chips at a speed of 1.0 mm/second. The probe was withdrawn at 10.0 mm/second. A sampling of 25 chips was used for each test. Analysis of the test chips resulted in an average peak force of 379 grams, which is statistically similar to LAY'S® Light Chips (OLESTRA™) 325.59 grams of force and Low Fat KETTLE KRISPS™ at 416.06 grams of force. LAY'S®. Classic was slightly less at 254.23 grams of force.

Test 1: Comparison of Chip Attributes: Samples of Potato Chips of the Present invention prepared by the process described in Example 1 compared with popular chips currently in the market.

In preferred embodiments, immediately following the blanching of sliced food pieces with high energy, intense radiant heat, the sliced food pieces are preferably cooked in rapidly moving streams of hot air issuing from rows of multiple impingement jets arranged above and below the conveyor belt. In preferred embodiments, the impingement of the air upon the sliced food pieces will be at the velocity of about 3,000 to about 8,000 feet per minute (fpm), preferably 4,000 fpm being one satisfactory rate at a temperature of from about 300 to about 450 degrees F. The sliced food pieces are preferably maintained confined against airborne movement in the dry air impingement stage for a period of time ranging from about 30 to 90 seconds. A substantial amount of moisture is removed from the sliced food pieces by the fast-moving hot, dry air and at the end of Test 2: Density measurement of potato chips using the multipycnometer. The multipycnometer (Quantachrome model MVP-D160-E) employs the technique of fluid displacement to determine volume. The fluid used in the instrument is helium. Potato chip volume was determined by measuring the pressure difference when a known quantity of helium is allowed to flow from a known reference volume into the sample cell containing the chips. Samples were weighed before measuring the volume. Each chip was broken into 2-4 pieces to allow them to fit into the measuring cell. Densities were calculated using the formula:

$$\frac{W}{Vc - \{V_R * [(P_1/P_2) - 1]\}}$$

W=weight of potato chips (g)
$V_C$=Cell volume (cm$^3$)*
$V_R$=Reference volume (cm$^3$)*
$P_1$=pressure reading of the reference
$P_2$=pressure reading of the cell
$V_C$ and $V_R$ were established during instrument calibration.

TABLE 2

Pycnometer Density Calculations of Potato Chips.

| Sample | Replicates | Density g/(cm$^3$) | Average g/(cm$^3$) |
|---|---|---|---|
| Test Product (regular) | 1 | 1.345 | 1.351 |
| | 2 | 1.359 | |
| | 3 | 1.350 | |

TABLE 2-continued

Pycnometer Density Calculations of Potato Chips.

| Sample | Replicates | Density g/(cm³) | Average g/(cm³) |
| --- | --- | --- | --- |
| Test Product (wavy) | 1 | 1.281 | 1.291 |
| | 2 | 1.315 | |
| | 3 | 1.278 | |
| LAY'S ® Classic | 1 | 1.178 | 1.191 |
| | 2 | 1.197 | |
| | 3 | 1.197 | |
| Low Fat Kettle Krisps | 1 | 1.373 | 1.355 |
| | 2 | 1.327 | |
| | 3 | 1.365 | |
| Ruffles ® | 1 | 1.156 | 1.171 |
| | 2 | 1.181 | |
| | 3 | 1.175 | |

EXAMPLE 2

Regular Fat-Free Potato Sticks: Russet Burbank Potatoes were peeled and cut Julienne style lengthwise to achieve approximately 2 mm height and width. After slicing 540 grams of these, the raw potato sticks were rinsed for under 65° F. running water for 15 seconds, Then the rinsed sticks were held in a solution containing 500 grams water (43° C./110° F.), 5 grams bacterial amylase (Lot No. ALI05175-04, American Laboratories, Inc.), 5 grams calcium chloride solution (32% solution Calcium Chloride from DSM Food Specialties) for 3 minutes. The enzyme treated potato sticks were drained, then blanched in 87° C./190° F. water containing 3% Cargill Sea Salt (3000 g cold water, plus 90 g salt) for 1 minute 30 seconds before draining, Blanched potato sticks were placed directly on perforated aluminum tray and put into an impingement oven (Impinger ® I, Model No. 1240 from Lincoln Food Service Products, Inc., Fort Wayne, Ind.) set at 140° C./285° F. Oven belt speed was set at 24 minutes, Every 5 minutes, the tray was shaken to stir the potato sticks to allow for even drying, The process yielded approximately 103 grams of fat-free potato sticks, which were then cooled and packaged. The potato sticks were evaluated by trained sensory professionals and were noted to have a pleasant cooked potato flavor, golden color, and light crisp texture.

EXAMPLE 3

Larger Size, Puffed Potato Strips: Yukon Gold potatoes were peeled and cut slices approximately 2 mm thick. These slices were then cut into strips approximately 6 mm wide. Approximately 750 grams of these raw potato strips were rinsed under 65° F. running water for 15 seconds. Then the rinsed strips were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato strips were drained, then blanched in 87° C./190° F. water containing 3% Cargill Sea Salt (3000 g water, plus 90 g salt) for 1 minute 30 seconds before draining. The blanched potato strips were placed directly on perforated aluminum tray and put into an impingement oven (Impinger® I, Model No. 1240 from Lincoln Food Service Products, Inc., Fort Wayne, Ind.) set at 135° C./1275° F. Oven belt speed was set at 27 minutes. Every 5 minutes, the tray was shaken to stir the potato strips to allow for even drying. The process yielded approximately 129 grams of fat-free potato strips, with a light texture, approximately 90% of the strips puffed into almost cylindrical shape, giving them the appearance of crispy French fries. The fat-free potato strips were, judged by trained sensory professionals to have a very rich buttery flavor, crisp light texture and appetizing appearance.

EXAMPLE 4

Carrot Chips: Carrots were peeled and cut into slices approximately 2 mm thick. Approximately 500 grams of these carrot slices were rinsed under 65° F. running water for 15 seconds. Then the rinsed carrot slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated carrot slices were drained, then blanched in 87° C./190° F. water containing 2% Cargill Sea Salt (2000 g water, plus 40 g. salt) for 1 minute 15 seconds before draining. The blanched carrot slices were placed directly on belt of an impingement oven (Impinger® I, Model No. 1240 from Lincoln Food Service Products, Inc., Fort Wayne, Ind.) set at 135° C./275° F. Oven belt speed was set at 15 minutes. The process yielded approximately 120 grams of fat-free carrot chips, with a light texture, bright orange color and pleasant sweet carrot flavor.

EXAMPLE 5

Fat-Free Beet Chips: Fresh red beets were peeled and cut into slices approximately 1.6 mm thick. Approximately 590 grams of these beet slices were rinsed under 65° F. running water for 15 seconds. Then the rinsed beet slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated beet slices were drained, then blanched in 87° C./190° F. water containing 2% Cargill Sea Salt (2000 g water, plus 40 g salt) for 1 minute 15 seconds before draining. The blanched beet slices were placed directly on belt of an impingement oven (Impinger® I, Model No. 1240 from Lincoln Food Service Products, Inc., Fort Wayne, Ind.) set at 135° C./275° F. Oven belt speed was set at 15 minutes. The process yielded approximately 130 grams of fat-free beet chips, with a light, crisp texture, dark beet red color and pleasant beet flavor.

EXAMPLE 6

Fat-Free Parsnips Chips: Fresh parsnip roots were peeled and cut into slices approximately 1.6 mm thick. Approximately 500 grams of these parsnip slices were rinsed under 65° F. running water for 15 seconds. Then the rinsed parsnip slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated parsnip slices were drained, then blanched in 87° C./190° F. water containing 2% Cargill Sea Salt (2000 g water, plus 40 g salt) for 1 minute 15 seconds before draining. Blanched parsnip slices were placed directly on belt of an impingement oven (Impinger® I, Model No. 1240 from Lincoln Food Service Products, Inc., Fort Wayne, Ind.) set at 135° C./275° F. Oven belt speed was set at 13 minutes. The process yielded approximately 120 grams of fat-free parsnip chips, with a light, crisp texture, creamy tan color and pleasant parsnip flavor.

EXAMPLE 7

Fat-Free Yucca Root (Maniac or Cassava) Chips: Fresh yucca roots were peeled and cut into slices approximately 1.6 mm thick. Approximately 1000 grams of these yucca root slices were rinsed under 85° F. running water for 15 seconds. Then the rinsed yucca root slices were held in a solution containing 750 grams water (43° C./110° F.), 7.5 grams bacterial amylase (Lot No. ALI05175-04, American Laboratories, Inc.), 7.5 grams calcium chloride (32% solution Calcium Chloride from DSM Food Specialties) for 3 minutes. The enzyme treated yucca root slices were drained, then blanched in 87° C./190° F. water containing 2% Cargill Sea Salt (2000 g water, plus 40 g salt) for 1 minute 15 seconds before draining. Blanched yucca root slices were placed in apple juice for 2 minutes, then drained and placed directly on belt of an impingement oven (Impinger® I, Model No. 1240 from Lincoln Food Service Products, Inc., Fort Wayne, Ind.) set at 135° C./275° F. Oven belt speed was set at 14 minutes. The process yielded approximately 200 grams of fat-free yucca root chips, with a light, crisp texture, very white in color and pleasant slightly sweet flavor.

EXAMPLE 8

Fat-Free Pineapple Chips: Fresh pineapple were cored, the cored portion was then cut into slices approximately 1.6 mm thick. Approximately 500 grams of these pineapple core slices were rinsed under 66° F. running water for 15 seconds. Then the rinsed pineapple core slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated pineapple slices were drained, then blanched in 87° C./190° F. water containing 2% Cargill Sea Salt (2000 g water, plus 40 g salt) for 1 minute 15 seconds before draining. The blanched pineapple slices were placed directly on belt of an impingement oven (Impinger® I, Model No. 1240 from Lincoln Food Service Products, Inc., Fort Wayne, Ind.) set at 140° C./285° F. Oven belt speed was set at 22 minutes. The process yielded approximately 128 grams of fat-free pineapple chips, with a light, crisp texture, bright yellow color and pleasant cooked pineapple flavor

EXAMPLE 9

Fat-Free Apple Chips: Fresh Fuji apples were washed then cut into slices approximately 2.0 mm thick. Approximately 900 grams of these apple slices were rinsed under 65° F. running water for 15 seconds, then placed in a 1% citric acid solution to prevent enzymatic browning. Then apple slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated apple slices were drained, then blanched in 87° C./190° F. water containing 2% Cargill Sea Salt, 2% calcium chloride solution (2000 g water, plus 40 g salt and 40 g calcium chloride solution) for 1 minute 15 seconds before draining. The blanched apple slices were placed directly on belt of an impingement oven (Impinger® I, Model No. 1240 from Lincoln Food Service Products, Inc., Fort Wayne, Ind.) set at 140° C./285° F. Oven belt speed was set at 14 minutes. The process yielded approximately 220 grams of fat-free apple chips, with a light, crisp texture, light tan color and pleasant cooked apple flavor.

EXAMPLE 10

Fat Free Pear Chips: Fresh d'Anjou pears were shed then cut into slices approximately 2.0 mm thick. Approximately 850 grams of these pear slices were rinsed under 85° F. running water for 15 seconds, then placed in a 1% citric acid solution to prevent enzymatic browning. Then pear slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated pear slices were drained, then blanched in 87° C./190° F. water containing 2% Cargill Sea Salt, 2% calcium chloride solution (2000 g water, plus 40 g salt and 40 g calcium chloride solution) for 1 minute 15 seconds before draining. The blanched pear slices were placed directly on belt of an impingement oven (Impinger® Model No. 1240 from Lincoln Food Service Products, Inc. Fort Wayne, Ind.) set at 140° C./285° F. Oven belt speed was set at 15 minutes. The process yielded approximately 200 grams of fat-free pear chips, with a light, crisp texture, light tan color and pleasant cooked pear flavor.

EXAMPLE 11

Fat-Free Purple Sweet Potato Chips: Purple Sweet Potatoes were peeled and sliced into slices approximately 1.8 mm thick. After slicing, 1000 grams of these raw sweet potato slices were rinsed under 65° F. running water for 15 seconds. Then the rinsed slices were blanched in 87° C./190° F. water containing 2% Cargill Sea Salt (2000 g cold water, plus 40 g salt) for 1 minute 30 seconds before draining. Blanched potato slices were placed directly on chain belt of impingement oven (Impinger® I, Model No. 1240 from Lincoln Food Service Products, Inc., Fort Wayne, Ind.) set at 140° C./285° F. Oven belt speed was set at 14 minutes. The process yielded approximately 225 grams of fat-free sweet potato chips, which were cooled and packaged. The purple sweet potato slices were evaluated by trained sensory professionals and were noted to have a very pleasant sweet flavor, novel dark purple color, and light crisp texture.

EXAMPLE 12

Fat-Free Radish Chips: Fresh red table radishes were cut into slices approximately 1.75 mm thick. Approximately 500 grams of these radish slices were rinsed under 65° F. running water for 15 seconds. Then the rinsed radish slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated radish slices were drained, then blanched in 87° C./190° F. water containing 2% Cargill Sea Salt (2000 g water, plus 40 g salt) for 45 seconds before draining. Blanched radish slices were placed directly on belt of an impingement oven (Impinger® I, Model No. 1240 from Lincoln Food Service Products, Inc., Fort Wayne, Ind.) set at 135° C./275'F. Oven belt speed was set at 11.5 minutes. The process yielded approximately 109 grams of fat-free radish chips, with a light, crisp texture, creamy tan color and astringent radish flavor.

EXAMPLE 13

Fat-Free Taro Chips: Fresh taro roots were peeled and cut into slices approximately 1.6 mm thick. Approximately 1000 grams of these taro slices were rinsed under 65° F. running water for 15 seconds. Then the rinsed taro slices were held in a solution containing 750 grams water (43° C./110° F.), 7.5 grams bacterial amylase (Lot No. ALI05175-04, American Laboratories, Inc.), 5 grams calcium chloride (32% solution Calcium Chloride from DSM Food Specialties) for 3 minutes. The enzyme treated taro slices were drained, then blanched in 87° C./190° F. water containing 2% Cargill Sea Salt (2000 g water, plus 40 g salt) for 1 minute before draining. Blanched taro slices were placed directly on belt of an impingement oven (Impinger® I, Model No. 1240 from Lincoln Food Service Products, Inc., Fort Wayne, Ind.) set at 135° C./275° F. Oven belt speed was set at 12 minutes. The process yielded approximately 255 grams of fat-free taro chips, with a light, crisp texture, creamy tan color retaining the natural pink/red speck inherent in the taro root. Flavor was very mild, slightly sweet, and pleasant.

EXAMPLE 14

Fat-Free Pumpkin Chips: A small fresh pumpkin (approximately 10 inches in diameter) was cut in quarters, seeds were removed, then the flesh was cut into slices approximately 1.8 mm thick. Approximately 1000 grams of these raw pumpkin slices were rinsed under 65° F. running water for 15 seconds. Then the rinsed pumpkin slices were held in a solution containing 750 grams water (43° C./110° F.), 7.5 grams bacterial amylase (Lot No. ALI05175-04, American Laboratories, Inc.), 5 grams calcium chloride (32% solution Calcium Chloride from DSM Food Specialties) for 3 minutes, The enzyme treated pumpkin slices were drained, then blanched in 87° C./190° F. water containing 2% Cargill Sea Salt (2000 g water, plus 40 g salt) for 30 seconds before draining. The blanched pumpkin slices were placed directly on belt of an impingement oven (Impinger® I, Model No. 1240 from Lincoln Food Service Products, Inc., Fort Wayne, Ind.) set at 135° C./275° F. Oven belt speed was set at 11 minutes, The process yielded approximately 246 grams of fat-free pumpkin chips, with a light, crisp texture, orange/tan color and a very mild and pleasant flavor.

EXAMPLE 15

Fat-Free Rutabaga Chips: Fresh rutabagas peeled and were cut into slices approximately 1.6 mm thick. Approximately 500 grams of these rutabaga slices were rinsed under 65° F. running water for 15 seconds. Then the rinsed rutabaga slices were held in a solution containing 500 grams water (43° C./110° F.), 5 grams bacterial amylase (Lot No. ALI05175-04, American Laboratories, Inc., Omaha, Nebr.), 5 grams calcium chloride (32% solution Calcium Chloride from DSM Food Specialties) for 3 minutes. The enzyme treated rutabaga slices were drained then blanched in 87° C./190° F. water containing 2% Cargill Sea Salt (2000 g water, plus 40 g salt) for 1 minute 10 seconds before draining. The blanched rutabaga slices were placed directly on belt of an impingement oven (Impinger® I, Model No. 1240 from Lincoln Food Service Products, Inc., Fort Wayne, Ind.) set at 135° C./275° F. Oven belt speed was set at 12.5 minutes. The process yielded approximately 134 grams of fat-free rutabaga chips, with a light, crisp texture, bright tan color and typical cooked rutabaga flavor.

EXAMPLE 16

Fat Free Zucchini Chips: Several small fresh zucchini (approximately 2.5 inches in diameter and 8 inches in length were peeled, the center core (approximately 0.5 inch diameter) was removed, then the prepared zucchini were cut into slices approximately 2.0 mm thick using a kitchen mandolin with a serrated blade. Approximately 1000 grams of these raw zucchini slices were rinsed under 65° F. running water for 15 seconds. Then the rinsed slices were held in a solution containing 750 grams water (43° C./110° F.), 15 grams dried enzyme preparation (Lot No. SI9700, Multizyme II, Enzyme Development Corp, New York, N.Y.), 10 grams calcium chloride (32% solution Calcium Chloride from DSM Food Specialties) for 3 minutes. The enzyme treated zucchini slices were drained, then blanched in 87° C./190° F. water containing 2% Cargill Sea Salt (2000 g water, plus 40 g salt) for 45 seconds before draining. The blanched zucchini slices were placed directly on belt of an impingement oven (Impinger® I, Model No. 1240 from Lincoln Food Service Products, Inc., Fort Wayne, Ind.) set at 135° C./275° F. Oven belt speed was set at 18 minutes. The process yielded approximately 96 grams of fat-free zucchini chips, with a light, crisp texture, light yellow/tan color with a very mild and pleasant flavor.

EXAMPLE 17

Fat-Free Mushrooms Chips: Several small fresh button mushrooms (approximately 2.5-3 inches cap diameter) were cut into slices approximately 2.4 mm thick using a kitchen mandolin. Approximately 500 grams of these raw mushroom slices were rinsed under 65° F. running water for 15 seconds. Then the rinsed slices were held in a solution containing 750 grams water (43° C./110° F.), 15 grams dried enzyme preparation (Lot No. SI9700, Multizyme II, Enzyme Development Corp New York, N.Y.), 10 grams calcium chloride (32% solution Calcium Chloride from DSM Food Specialties) for 3 minutes. The enzyme treated mushroom slices were drained, then blanched in 87° C./190° F. water containing 2% Cargill Sea Salt (2000 g water, plus 40 g salt) for 45 seconds before draining. Blanched mushroom slices were placed a screen sheet and placed in an impingement oven (Impinger® I, Model No. 1240 from Lincoln Food Service Products, Inc., Fort Wayne, Ind.) set at 135° C./275° F. Oven belt speed was set at 22 minutes. The process yielded approximately 64 grams of fat-free mushroom chips, with a very light texture, tan color very, mild and pleasant pungent cooked mushroom flavor.

EXAMPLE 18

Fat-Free Green Bean Sticks: Fresh green beans (Blue Lake Variety) were rinsed, the ends were trimmed, then approximately 1000 grams of these raw green beans were rinsed under 65° F. running water for 16 seconds. Next the rinsed bean pods were held in a solution containing 750 grams water (43° C./110° F.), 15 grams dried enzyme preparation (Lot No. SI9700, Multizyme II, Enzyme Development Corp. New York, N.Y.), 10 grams calcium chloride (32% solution Calcium Chloride from DSM Food Specialties) for 3 minutes. The enzyme treated bean pods were drained, then blanched in 87° C./190° F. water containing 2% Cargill Sea Salt (2000 g water, plus 40 g salt) for 4 minutes before draining. The blanched green bean pods were placed a screen sheet on belt of an impingement oven (Impinger® I, Model No. 1240 from Lincoln Food Service Products, Inc., Fort Wayne, Ind.) set at 135° C./275° F. Oven belt speed was set at 28 minutes. The process yielded approximately 172 grams of fat-free green bean snack sticks, with a light, crisp texture, green and brown in color with a very mild and pleasant flavor.

EXAMPLE 19

Regular Fat Free Potato Chips, pre-processed slices held under refrigerated conditions for 1 week then dried/cooked: Atlantic Variety chipping potatoes were peeled and sliced using a Dito Dean vegetable slicer with a C2 blade, to achieve a slice thickness of approximately 1.60 mm. After slicing, 1000 grams of these raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. The enzyme treated potato slices were drained, then blanched in 87° C./190° F. water containing 2% Cargill Sea Salt (3000 g cold water, plus 60 g. salt) for 1 minute before draining. The blanched potato slices were cooled in ice water, then drained and stored in plastic bags in a cooler at 3° C./38° F. for 7 days. Samples were removed from the cooler, placed in on a metal screen in a single layer and processed in an industrial Air Force® impingement oven (Heat and Control Company, Hayward, Calif. 94546) set at 176° C./350° F. for 3.5 minutes. The partially dried potato slices were then piled together to create a bed depth of 1 inch, then processed through a second Air Force® impingement oven (Heat and Control Company Hayward, Calif. 94546) for an additional 3.5 minutes at 148° C./300° F. The process yielded approximately 200 grams of fat-free potato chips, which were cooled and packaged. The potato chips were evaluated by trained sensory professionals and were noted to have a pleasant cooked potato flavor, golden color, and light crisp texture. The seven day holding time for the pre-processed slices did not affect the texture or flavor of the finished product.

EXAMPLE 20

Novel Sweet Potato Cereal-Regular Sweet Potato Flakes: Novel Sweet Potato Cereal-Regular Sweet Potatoes were peeled and cut lengthwise into strips approximately 0.75-1 inch thick, then the strips were sliced across into small flakes approximately 2 mm thick. After slicing, approximately 1000 grams of these raw sweet potato flakes were rinsed under 65° F. running water for 15 seconds. Then the rinsed flakes were blanched in 87° C./190° F. water containing 1% Cargill Sea Salt and 0.5% calcium chloride solution (32% solution Calcium Chloride from DSM Food Specialties) (5000 g cold water, plus 50 g. salt, 25 grams calcium chloride) for 1 minute before draining. The blanched sweet potato flakes were placed directly on an aluminum screen, and put into an impingement oven (Impinger® I, Model No. 1240 from Lincoln Food Service Products, Inc., Fort Wayne, Ind.) set at 140° C./285° F. Oven belt speed was set at 17 minutes. Every 5 minutes, the screen was shaken to stir the potato flakes to allow for even drying. The process yielded approximately 284 grams of fat-free sweet potato flakes, which were cooled and packaged. The sweet potato flakes were evaluated by trained sensory professionals and were noted to have a pleasant sweet nutty flavor, golden brown color, and light crisp texture when eaten with milk in a bowl like a grain based cereal. The product retained its crisp texture for a bowl life of 7-8 minutes.

EXAMPLE 21

Regular Fat-Free Potato Chips made by Initial dry with Infrared Heater, then finish dry in Impingement: Atlantic Variety chipping potatoes were peeled and sliced using a Dito Dean vegetable slicer with a C2 blade, to achieve <a slice thickness of approximately 1.60 mm. After slicing, 1000 grams of the raw potato slices were rinsed, for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. The enzyme treated potato slices were drained then blanched in 87° C./190° F. water containing 2% Cargill Sea Salt (3000 g cold water, plus 60 g. salt) for 1 minute before draining. The blanched potato slices were placed on a conveyor and run under an infrared heater unit for 30 seconds. Then the partially dried slices were immediately put into an industrial Air Force® impingement oven (Heat and Control Company, Hayward, Calif. 94545) set at 176° C./350° F. for 3 minutes. The partially dried potato slices were then piled together to create a bed depth of 1 inch, then processed through a second Air Force® impingement oven (Heat and Control Company, Hayward, Calif. 94545) for an additional 3 minutes at 148° C./300° F. The process yielded approximately 200 grams of fat free potato chips, which were cooled and packaged. The potato chips were evaluated by trained sensory professionals and were noted to have a pleasant cooked potato flavor, golden color, and light crisp texture.

EXAMPLE 22

Regular Fat-Free Potato Chips made by Initial dry in Microwave, then finish dry in Impingement oven: Atlantic Variety chipping potatoes were peeled and sliced using a Dito Dean vegetable slicer with a C2 blade, to achieve a slice thickness of approximately 1.60 mm. After slicing, 1000 grams of the raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. Enzyme treated potato slices were drained, then blanched in 87° C./190° F. water containing 2% Cargill Sea. Salt (3000 g cold water, plus 60 g. salt) for 1 minute before draining. The blanched potato slices were placed in on plastic disc and put into a Microwave Oven (Amana RadarRange, Model No. RS415T, 1500 Watts, manufactured by Amana Appliances, Amana, Iowa) for 1 minute at full power. After microwave drying the partially dried potato slices were then placed directly on the belt in an industrial Air Force® impingement oven (Heat and Control Company, Hayward, Calif. 94545) set at 176° C./350° F. for 1.5 minutes. The potato slices were then piled together to create a bed depth of 1 inch, then ran through a second Air Force® impingement oven (Heat and Control Company, Hayward, Calif. 94545) for an additional 1.5 minutes but at 148° C./300° F. The process yielded approximately 200 grams of fat-free potato chips, which were cooled and packaged. The potato chips were evaluated by trained sensory professionals and were noted to have a pleasant cooked potato flavor, golden color, and light crisp texture.

EXAMPLE 23

Larger Size, Puffed Potato Strips made by steam blanch instead of immersion blanch, Lincoln Impingement finish: Yukon Gold potatoes were peeled and cut slices approximately 2 mm thick. These slices were then cut into strips approximately 6 mm wide, 6 cm in length. Approximately 750 grams of the raw potato strips were rinsed under 65° F. running water for 15 seconds. Then the rinsed strips were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato strips were drained, then blanched using steam in a M-6 Dixie Vegetable Blancher/Cooler (Dixie Canning Company, Athens Ga., 30603) for 30 seconds. The hot steam blanched potato strips were placed directly on perforated aluminum tray and put into an impingement oven (Impinger® I, Model No. 1240 from Lincoln Food Service Products, Inc., Fort Wayne, Ind.) set at 135° C./1275° F. Oven belt speed was set at 27 minutes. Every 6 minutes, the tray was shaken to stir the potato strips to allow for even drying. The process yielded approximately 129 grams of fat-free potato strips, with a light texture, approximately 90% of the strips puffed into almost cylindrical shape, giving them the appearance of crispy French fries. The fat-free potato strips were judged by trained sensory professionals to have a very rich buttery flavor, crisp light texture and appetizing appearance.

EXAMPLE 24

Impingement oven for initial dry, then pulsing fluid bed dryer for Final Regular Fat Free Potato Atlantic Variety chipping potatoes were peeled and sliced using a Dito Dean vegetable slicer with a C2 blade, to achieve slice thicknesses of approximately 1.60 mm. After slicing, 1000 grams of the raw potato slims were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.), 10 grams calcium chloride solution (32% solution Calcium Chloride from DSM Food Specialties) for 3 minutes. The enzyme treated potato slices were drained, then blanched in 87° C./190° F. water containing 2% Cargill Sea Salt (3000 g cold water, plus 60 g. salt) for 1 minute before draining. The blanched potato slices were placed directly on the belt of and impingement oven set at 176° C./350° F., and dried for 1 minute to reduce the moisture content to 50%, then the chips were layered to a bed depth of 3 inches, then placed into an industrial Aeropulse® pulsed-air fluid bed processor (Aeroglide Corporation, Raleigh, N.C. 27626) set at 148° C./300° F. for 5 minutes. The process yielded approximately 200 grams of fat free potato chips, which were cooled and packaged. The potato chips were evaluated by trained sensory professionals and were noted to have a pleasant cooked potato flavor, golden color, and light crisp texture.

EXAMPLE 25

Wavy or Ripple Fat-Free Potato Chips: Atlantic variety potatoes were peeled and sliced on a mandolin corrugated blade so that slices approximately 2 mm height at the thickest point and 1.65 mm at the thinnest point were formed very similar in appearance, shape and thickness to potato chips marketed currently under the names of "wavy" or "Ripple" chips. After slicing, 500 grams of these the raw potato slices were rinsed for under 65° F. running water for 15 seconds. Then the rinsed slices were held in a solution containing 500 grams water (43° C./110° F.), 5 grams bacterial amylase (Lot No. ALI05175-04, American Laboratories, Inc.), 5 grams calcium chloride solution (32% solution Calcium Chloride from DSM Food Specialties) for three minutes. The enzyme treated potato slices were drained, then blanched using steam in a M6 Dixie Vegetable Blancher/Cooler (Dixie Canning Company, Athens Ga., 30603) by exposing the slices directly to steam for 30 seconds at atmospheric conditions, Blanched potato slices were placed directly on and put into an impingement oven (Impinger ® I, Model No. 1240 from Lincoln Food Service Products, Inc., Fort Wayne, Ind.) set at 140° C./285° F. Oven belt speed was set at 24 minutes. The process yielded approximately 110 grams of fat-free potato chips, which were then cooled and packaged. The potato chips were evaluated by trained sensory professionals and were noted to have a pleasant cooked potato flavor, golden color, and light crisp texture.

EXAMPLE 26

Puffy Potato Chips: Yukon Gold potatoes were peeled and cut into slices approximately 2 mm thick. Approximately 750 grams of these raw potato strips were rinsed under 65° F. running water for 15 seconds, Then the rinsed slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato slices were drained, then blanched in 87° C./190° F. water containing 2.5% Cargill Sea Salt (3000 g water, plus 75 g salt) for 1 minute 30 seconds before draining. Blanched potato slices were placed directly on a wire belt and ran through an impingement oven (Impinger® I, Model No. 1240 from Lincoln Food Service Products, Inc., Fort Wayne, Ind.) set at 140° C./285° F. Oven belt speed was set at 9 minutes for the initial pass, then the potato slices were ran through again for 6 minutes. The process yielded approximately 135 grams of fat-free potato chips, with a light texture, approximately 90% of the chips puffed into a thicker shape with a pillow-like appearance and hollow center. These puffy, fat-free potato chips were judged by trained sensory professionals to have a very rich buttery flavor, crisp light texture, and appetizing appearance.

EXAMPLE 27

Fat-Free Sweet Potato Chips: Organic Japanese Sweet Potatoes were peeled and sliced into slices approximately 1.8 mm thick. After slicing, 1000 grams, of these raw sweet potato slices were rinsed under 65° F. running water for 15 seconds, Then the rinsed slices were blanched in 87° C./190° F. water containing 2% Cargill Sea Salt (2000 g cold water, plus 40 g salt) for 1 minute 30 seconds before draining. Blanched slices were placed directly on chain belt of impingement oven (Impinger® I, Model No. 1240 from Lincoln Food Service Products, Inc., Fort Wayne, Ind.) set at 140° C./285° F. Oven belt speed was set at 14 minutes. The process yielded approximately 230 grams of fat-free sweet potato chips, which were cooled and packaged. The sweet potato chips were evaluated by trained sensory professionals and were noted to have a very pleasant sweet flavor, bright orange color, and light crisp texture.

EXAMPLE 28

Use of Rotary or Rotary Drum Dryer as the first step of the cooking process: Chipping potatoes were washed, peeled, sliced to approximately 1.55 mm thickness, and then washed and exposed to a solution containing bacterial amylase (Lot. No. ALI 05175-04, American Laboratories, Inc.), and calcium chloride solution (32% solution Calcium Chloride from DSM Food Specialties). Next the enzyme treated potato slices were drained followed by blanching at 87° C./190° F. water containing 2% Cargill sea salt before then again draining. Then the blanched potato slices were cooled and stored. Several samples of the sliced potatoes were tested on an Omni Mark moisture analyzer available from Denver Equipment Company before and after the dehydrating step. The analyzer indicated that raw enzyme treated potato slices had a moisture level between 80% and 85% after blanching and just prior to drying.

The sliced potatoes were then placed in bulk form inside a rotary drum dryer provided by Spray Dynamics and partially dehydrated in mass quantity at a temperature of about 300° F. for about 10 minutes. The partially dehydrated slices were then removed from the rotary dryer and visually tested for quality, color, texture, breakage, smell and flavor. Surprisingly, all slices had an excellent texture, color, flavor, smell, and, even, more surprisingly minimal, if any, breakage, sticking or any other visual impairment was noticed, The drying was uniform and all slices had similar color and a consistent level of dehydration.

The test was repeated for several times at temperatures ranging between about 275° F. and about 350° F. and for periods as low as about 5 and as high as about 14 minutes. The visual results were all surprisingly good as in the first trail and consistent among trials.

Moisture levels following the dehydrating processes of various lengths between about 5 to about 14 minutes produced snack food slices with a moisture content ranging between about 40% and about 70%.

To further test the efficacy of the teachings of the present invention an additional test was conducted using the rotary drum dryer available from Spray Dynamics. Potato slices without enzyme treatment were placed in the drum dryer in the same manner as explained above and partially dehydrated at 300° F. for periods as high as about 12 minutes. The process consistently produced less preferable results as, following the dehydrating step, the slices had a color, texture, quality, flavor and odor deemed to be commercially undesirable. The drying was inconsistent. Some slices had dried out to a hard consistency similar to and/or as of dehydrated potatoes. Other slices, however, were totally or partially wet or even burnt totally or around the edges. It is believed that food products containing high levels of starch will be greatly enhanced by using an enzyme treatment as the enzyme treatment possibly breaks down the sugars on the surface of the food slice.

Then, the pretreated dehydrated potato slices of potatoes processed in accordance with the teachings of the present invention were used to produce potato chips that have same texture, crunchiness, color, taste and mouth feel as conventionally deep fried potato chips. Pretreated potato slices cooked at a temperature of about 300° F. for about 8 minutes containing approximately 51% moisture (Pretreated Dehydrated Potato Slices) were used in the following tests.

EXAMPLE 28A

Approximately 5,000 grams of the Pretreated Dehydrated Potato Slices were poured onto the opening conveyer belt of a fluidized bed dryer available from Witte Company and were further massively subjected to heat at a temperature of about 325° F. for about 6 minutes. The air velocity was between about 300 to about 350 cfm. The cooked Pretreated Dehydrated Potato Slices were then left to cool down to ambient temperature (80° F.). The resulting potato chips, included some air pockets/blistering resembling conventional fried chips, and had excellent texture, mouth feel, taste, color, and crunchiness totally commensurate with or better than that of their counterpart potato chips that are made through conventionally deep frying methods. The trial yielded approximately 1,990 grams of fat free potato chips.

EXAMPLE 28B

Approximately 1,500 grams of the Pretreated Dehydrated Potato Slices were placed in a multiple layer configuration on the conveyer belt of an industrial Air Force® impingement oven (Heat and Control Company, Hayward, Calif. 94545) creating a bed depth of 1 inch, then processed for 5.5 minutes at 148° C./300° F. The process yielded approximately 660 grams of fat-free potato chips, which were cooled and packaged. The potato chips were evaluated by trained sensory professionals and were noted to have a pleasant cooked potato flavor, golden color, and light crisp texture.

EXAMPLE 28C

Approximately 2,000 grams of the Pretreated Dehydrated Potato Slices were processed further in a multi layer format using an industrial Aeropulse® pulsed-air fluid bed processor (Aeroglide Corporation, Raleigh, N.C. 27626) set at 148° C./300° F. for 5 minutes. The process yielded approximately 830 grams of fat free potato chips, which were cooled and packaged. The potato chips were evaluated by trained sensory professionals and were noted to have a pleasant cooked potato flavor, golden color, and light crisp texture.

EXAMPLE 28D

Approximately 1000 grams of the Pretreated Dehydrated Potato Slices were further processed using a convection oven (Model # 6203, Lincoln Steam'r Oven, Lincoln Food Service Products, Fort Wayne, Ind.). The potato slices were placed on perforated trays and cooked in the oven for 12 minutes at 148° C./300° F. until the products were fully dried. The trial resulted in approximately 400 grams of finished fat free potato chips. The potato chips were evaluated by trained sensory professionals and were noted to have a pleasant cooked potato flavor, golden color, and light crisp texture.

EXAMPLE 28E

Approximately 2000 grams of the Pretreated Dehydrated Potato Slices were further processed in a stationary tray dryer (National Dryer Machinery Company, Philadelphia, Pa.), by placing the potato slices in a layer approximately ¾ inch deep and drying for 16 minutes at a temperature of 148° C./300° F. The trial resulted in approximately 810 grams of fat free potato chips. These chips were evaluated by trained sensory professionals and were noted to have a bright golden color, excellent potato chip flavor and light crisp texture.

EXAMPLE 29

Impingement oven for initial dry, then vibrating fluidized bed dryer for final Regular Fat Free Potato Chips: Snowden variety chipping potatoes were washed and sliced using a Ditto Dean vegetable slicer with a C3 blade, to achieve slice thicknesses of approximately 1.60 mm. After slicing, 3.95 lbs. of the raw potato slices were rinsed for under 65° F. running water for 15 seconds. Then the rinsed slices were held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated potato slices were drained, then blanched using steam in a M-6 Dixie Vegetable Blancher/Cooler (Dixie Canning. Company, Athens Ga., 30603) for 40 seconds. The blanched potato slices were placed directly on the belt of and impingement oven set at 176° C./350° F., and dried for 5 minutes to reduce the moisture content to 36%, then the chips were layered to a bed depth of 2 inches, then placed into an lab model vibrating fluid bed processor (Carrier Vibrating Equipment, Inc., Louisville, Ky. 40213) with a drilled hole type plate, and dried/cooked at 160° C./320° F. for 2 minutes. The process yielded approximately 1 pound of fat free potato chips, which were cooled and packaged. The potato chips were evaluated by trained sensory professionals and were noted to have a pleasant cooked potato flavor, golden color, and light crisp texture.

EXAMPLE 30

Steam Blanch then vibrating fluidized bed dryer for entire drying step on Fat Free Sweet Potato Chips: Common variety sweet potatoes were washed, peeled, and sliced using a Ditto Dean vegetable slicer with a C3 blade, to achieve slice thicknesses of approximately 1.80 mm. After slicing, 3.0 lbs. of the raw sweet potato slices were rinsed for under 65° F. running water for 15 seconds. Then the rinsed slices were drained and blanched using steam in a M-6 Dixie Vegetable Blancher/Cooler (Dixie Canning Company, Athens Ga., 30603) for 50 seconds. The blanched sweet potato slices were rinsed under cold water spray for 3 minutes, drained then stored in plastic bags in a cooler overnight The blanched sweet potato slices were layered to a bed depth of 2 inches in an lab model vibrating fluid bed processor (Carrier Vibrating Equipment, Inc., Louisville, Ky. 40213) with a drilled hole type plate, and dried/cooked at 176° C./360° F. for 4 minutes. Temperature of the processor was then reduced to 160° C./320° F. and product was cooked for an additional 2 minutes before the processor temperature was reduced to 148° C./300° F. for additional two minutes of final drying/cooking time. The sequential temperature reductions allowed for a controlled drying process, maintaining product temperature below 148° C./300° F. at the final stages of drying when no evaporative cooling was taking place to prevent product browning and controlling caramelization of natural sugars present in the product. This controlled process yielded approximately 0.75 of fat-free sweet potato chips, which were cooled and packaged. The sweet potato chips were evaluated by trained sensory professionals and were noted to have a very pleasant sweet flavor, bright orange color, and light crisp texture.

The above process was repeated a number of times with sweet potatoes that were additionally treated with calcium chloride, amylase enzyme and the combination of the two yielding desired products with great color, texture and taste. Additionally, pears, apples, squash, and a varieties of carrots including yellow, orange, white and purple carrots were processed in similar procedures as above all resulting in excellent products having great taste, color and texture.

EXAMPLE 31

Steam Blanch, then vibrating fluidized bed dryer for entire drying step on Fat Free Potato Sticks: Common Russet potatoes were washed, peeled, and sliced using a Ditto Dean vegetable slicer with an AS-4 blade, to achieve juilienne slice or stick shape with 2.0 mm square, and average length of 8 cm. After slicing, 2.80 lbs. of the raw potato sticks were rinsed for under 65° F. running water for 15 seconds. Then the rinsed potato sticks were drained, held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated potato sticks were drained, and blanched using steam in a M-6 Dixie Vegetable Blancher/Cooler (Dixie Canning Company, Athens Ga., 30603) for 55 seconds. The blanched potato sticks were rinsed under cold water spray for 3 minutes, drained, then potato sticks were marinated in a in a solution containing 1000 g, water, 75 grams of tomato juice, 10 grams lemon juice, 10 grams carrot juice plus 10 grams of salt in a cooler overnight. The following day, the marinated potato sticks were drained and layered to a bed depth of 2 inches in an lab model vibrating fluid bed processor (Carrier Vibrating Equipment, Inc., Louisville, Ky. 40213) with a drilled hole type plate, and dried/cooked at 160° C./320° F. for 6 minutes. Temperature of the processor was then reduced to 148° C./300° F. and product was cooked for an additional 2 minutes before the processor temperature was reduced to 140° C./285° F. for additional two minutes of final drying time. The sequential temperature reductions allowed for a controlled drying process, maintaining product temperature below 148° C./300° F. at the final stages of drying when no evaporative cooling was taking place to prevent product browning and controlling caramelization of natural sugars present in the product. This controlled process yielded approximately 0.60 of fat-free potato sticks, which were cooled and packaged. The resulting product was very bright golden in color, with a pleasant, slightly salty buttery potato flavor and having an excellent crispy light texture.

EXAMPLE 32

Fat-Free Tortilla Chips using vibrating fluidized bed dryer for final cooking: Commercial 6 inch diameter white corn tortillas were purchased at the local grocery store, each tortilla was out into eight wedges or triangles. Approximately 500 grams of these tortilla pieces were held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated tortilla pieces were drained, then layered to a bed depth of 1½ inches and placed into a lab model vibrating fluid bed processor (Carrier Vibrating Equipment, Inc., Louisville, Ky. 40213) with a drilled hole type plate, and dried/cooked at 160° C./320° F. for 7 minutes. The process yielded approximately 200 grams of tortilla chips, which were cooled and packaged. The tortilla chips were evaluated by trained sensory professionals and were noted to have a pleasant cooked tortilla flavor, a very light golden color, smooth appearance, and light crisp texture. When compared with a sample processed in a similar manner but without the enzyme treatment, the sample processed using the procedure of the present invention was noted to be much lighter in texture and exhibited a lighter crunch and crispiness. The sample processed without enzyme treatment but rather held in just water for 3 minutes was tough and less crispy than the one which was produced using the process of the present invention.

EXAMPLE 33

Crispness Tests. Vegetable snack chips are favored for their crispy, crunchy bite which is particularly characteristic of traditional fried chips. Crispness and crunchiness can be quantified with an instrument that records the force required to break chips as well as their stiffness prior to failure. The ratio of increased resistance to increased flexure or deformation is Young's modulus (also called the elastic modulus). Vickers and Christensen (Vickers, and Christensen, C. M. 1980. Relationship between sensory crispness and other sensory and instrumental parameters. Journal of Texture Studies 11: 291-307.) found that, of instrumental measurements, Young's modulus had the highest correlation to crispness in foods. These authors showed that it is also helpful to record the sound made when the chip breaks since they found crispness was very closely related to loudness during fracture. The importance of snack food sound is underscored by Vickers' (Vickers, Z. M. 1983. Pleasantness of Food Sounds. Journal of Food Science 48: 783-786.) observation that pleasantness of food sounds was highly correlated with descriptors 'crisp' and 'crunchy.'

Accordingly, to be perceived as crisp and crunchy, snack food products need to clave an adequate stiffness, (as reflected in Young's modulus) and to emit at least a certain level of sound upon breaking. At the same time, snack food products should not require so great a force as to cause mouth pain or injury. To evaluate crispness, samples were fractured on a TA.XT Plus Texture Analyzer (Stable Microsystems, Godalming, U.K.) fitted with a TA-101 Chip Rig and a 5 kg load cell. The TA-101 rig has 2 cm diameter by 2 cm tail pipe which supports the chip in a horizontal position. A 5 mm ball descended at 1 mm/sec until 5 g resistance was sensed, then it continued 30 mm and the force of resistance was recorded as the chip bent and fractured. A Stable Microsystems Audio Envelope Detector was used to record the sound produced during fracture.

To demonstrate the crispness/crunch of various snack products, representative samples were analyzed to measure the force required and acoustic levels resulting from fracturing chips. The analysis methods consisted of testing samples of chips listed in Table 3 below, labeled A through M, with samples A, B, C, D, L and M being produced in accordance to the present invention as described in examples 28, 24, 25, 26, 27 and 5 respectively, with retail samples E, F, G, H, I J, and K purchased at a local grocery store in Lincoln, Nebr. Representative chips were selected from each sample, handled, and analyzed in a consistent manner to obtain the data presented in Tables 3, 4, 5 and 8.

From each sample of about 25 chips, 9 chips were selected for the test. The more uniform chips were selected for measurement, because chips were variable in thickness and blistering. The nine selected chips were fractured and measurements were made of the force required to fracture each chip as the probe broke each chip while moving toward the chip at a uniform speed of 1 mm/second. Exponent software was used to generate a plot of force (Newtons) against distance (mm), and to determine (1) the initial slope, which is Young's Modulus, as discussed above, (2) the peak force required to fracture the chip and (3) peak loudness upon fracture of the chip. Excel Spreadsheet software was used to calculate means, standard deviation and coefficient of variation, Prior to this objective testing, samples A, B, C, D, L and M were all tasted and found to be favorably crisp and crunchy and samples E through K were determined to be within the indicated shelf life on the original package.

Graphs plotting force (N) against distance (mm) traveled by the probe were generated for each force measurement. Each of these plots depict a series of increases in resistance to applied force as the chip bends under pressure from the probe just prior to fracture. The probe is moving toward the chip at a constant velocity of 1 mm per second (1 mm/sec). In each case, the increase in resistance to applied force is followed by a sudden drop in resistance to such force as the chip breaks. In most cases, the chips fracture and break in a series of fractures. The first fracture, however, is the focus for determining the peak force required, to fracture the chip. The peaks created in this way, characterize the chip's texture, i.e., how much does the chip resist bending before breaking, how far will it bend before breaking and at what distance and force does it break. These quantities 'fingerprint' fracture properties and their crispness and crunchiness. The sudden loss in resistance (after the force peaks) is accompanied by a recorded sound event since the chip is set vibrating by the sudden loss in deformation and stress. As noted above, typical graphs include 2 to 4 major force peaks and a corresponding number of sound peaks. The slope prior to each peak estimates the aforementioned Young's modulus, which is a good estimate of crunchiness. Since the samples tested were all crisp, any of the chips with an average Young's modulus greater than 3.5 N/mm are clearly crisp. In accordance with the present invention, it is preferable to produce a snack food product with a Young's modulus of about 3.5, more preferably about 4.0, even more preferably 4.5, and even more preferably about 5.0 N/mm. It is also preferable to have a snack food product that will fracture at about 12, preferable about 10 and more preferably about 9 N of force applied to the chip so that the snack food product is crunchy but does not require so much force so that is hurts to eat the product.

The results of testing are provided in Tables 3-6 below. The resulting sound level listed in Table 5 below do not have units as they are a relative number.

TABLE 3

Mean average for greatest force, sound and initial Young's modulus from the data presented in Tables 4-6.

| Sample | Force Peak (N) | Peak Sound | Young's Modulus (N/mm) |
|---|---|---|---|
| A—Thin chip of the present invention | 3.95 | 4097 | 13.7 |
| B—Wavy chip of the present invention | 4.58 | 3744 | 8.5 |
| C—Puffy chip of the present invention | 6.65 | 5968 | 19.7 |
| D—Thick chip of the present invention | 7.12 | 4139 | 15.7 |
| E—Lays ® Classic | 3.19 | 927 | 5.7 |
| F—Lays ® Fat Free with OLESTRA ™ | 2.59 | 1142 | 4.2 |

TABLE 3-continued

Mean average for greatest force, sound and initial Young's modulus from the data presented in Tables 4-6.

| Sample | Force Peak (N) | Peak Sound | Young's Modulus (N/mm) |
|---|---|---|---|
| G—Lays ® Kettle Cooked Chips | 5.14 | 1616 | 10.8 |
| H—Kettle ™ Chips (Kettle Brand) | 7.45 | 1447 | 14.2 |
| I—Low Fat Kettle ™ Krisp | 5.65 | 23229 | 9.9 |
| J—Kettle ™ Brand Bakes | 6.23 | 3886 | 10.2 |
| K—Terra ® Yukon Gold | 9.06 | 10513 | 18.3 |
| L—Sweet potato chips of the present invention | 8.77 | 6943 | 18.9 |
| M—Beet chips of the present invention | 3.62 | 3758 | 7.3 |

TABLE 4

Maximum Forrce (N).

| | REP 1 | REP 2 | REP 3 | REP 4 | REP 5 | REP 6 | REP 7 | REP 8 | REP 9 | MEAN | % Coefficient of Variation |
|---|---|---|---|---|---|---|---|---|---|---|---|
| A | 1.20 | 3.77 | 1.62 | 2.84 | 7.39 | 3.45 | 5.41 | 5.29 | 4.53 | 3.95 | 50% |
| B | 4.05 | 5.65 | 3.64 | 5.09 | 2.19 | 2.68 | 5.89 | 4.64 | 7.38 | 4.58 | 36% |
| C | 7.47 | 6.78 | 2.99 | 8.60 | 8.55 | 4.63 | 5.51 | 8.04 | 7.30 | 6.65 | 29% |
| D | 8.14 | 8.05 | 7.11 | 7.76 | 4.86 | 6.38 | 10.37 | 7.63 | 3.79 | 7.12 | 27% |
| E | 2.29 | 5.03 | 2.54 | 2.35 | 3.92 | 5.96 | 1.52 | 2.51 | 2.60 | 3.19 | 46% |
| F | 2.77 | 1.74 | 2.19 | 2.54 | 1.97 | 2.80 | 4.32 | 2.31 | 2.71 | 2.59 | 29% |
| G | 4.65 | 4.30 | 4.88 | 3.56 | 6.44 | 4.21 | 4.51 | 5.81 | 5.14 | 4.72 | 26% |
| H | 9.69 | 7.43 | 8.67 | 9.85 | 5.87 | 8.16 | 4.41 | 6.64 | 6.37 | 7.45 | 24% |
| I | 5.56 | 3.73 | 6.55 | 4.19 | 4.50 | 8.97 | 8.72 | 3.56 | 5.03 | 5.65 | 36% |
| J | 2.06 | 7.56 | 6.94 | 11.94 | 6.39 | 2.95 | 8.12 | 4.00 | 6.16 | 6.23 | 48% |
| K | 11.68 | 9.37 | 10.75 | 10.88 | 7.20 | 5.97 | 11.10 | 8.75 | 5.87 | 9.06 | 25% |
| L | 8.88 | 8.88 | 11.22 | 7.25 | 10.10 | 6.35 | 7.59 | 6.53 | 12.13 | 8.77 | 23% |
| M | 2.73 | 2.02 | 3.15 | 4.81 | 3.64 | 3.93 | 5.74 | 3.30 | 3.28 | 3.62 | 31% |

TABLE 5

Loudness.

| | REP 1 | REP 2 | REP 3 | REP 4 | REP 5 | REP 6 | REP 7 | REP 8 | REP 9 | MEAN | % Coefficient of Variation |
|---|---|---|---|---|---|---|---|---|---|---|---|
| A | 1587 | 4402 | 2229 | 2140 | 6902 | 4266 | 7714 | 4349 | 3287 | 4097 | 51% |
| B | 4427 | 3933 | 4247 | 4741 | 1728 | 3965 | 5592 | 2412 | 2656 | 3745 | 33% |
| C | 6618 | 7134 | 5599 | 7986 | 8598 | 5215 | 2246 | 5510 | 4813 | 5969 | 32% |
| D | 5211 | 4778 | 7179 | 4753 | 2436 | 4804 | 4158 | 2361 | 1577 | 4140 | 42% |
| E | 1293 | 915 | 634 | 583 | 1198 | 1432 | 875 | 633 | 782 | 927 | 34% |
| F | 389 | 661 | 634 | 1264 | 1299 | 1284 | 2544 | 1202 | 1008 | 1143 | 55% |
| G | 2269 | 1030 | 880 | 1462 | 2242 | 810 | 1355 | 1825 | 2674 | 1616 | 42% |
| H | 1549 | 1877 | 819 | 1132 | 1839 | 1571 | 1181 | 1041 | 2020 | 1448 | 29% |
| I | 5558 | 4560 | 8370 | 1698 | 5257 | 7193 | 4318 | 3479 | 4537 | 4997 | 39% |
| J | 1538 | 2237 | 4534 | 5610 | 1539 | 4445 | 6575 | 4060 | 4441 | 3887 | 45% |
| K | 506 | 1409 | 1175 | 1626 | 1136 | 935 | 630 | 938 | 1107 | 1051 | 33% |
| L | 7600 | 6965 | 1175 | 7909 | 5915 | 4004 | 8198 | 6015 | 4132 | 6944 | 34% |
| M | 2806 | 3791 | 2668 | 3527 | 3171 | 5403 | 6226 | 2593 | 3638 | 3758 | 33% |

TABLE 6

Young's Modulus (N/mm).

| | REP 1 | REP 2 | REP 3 | REP 4 | REP 5 | REP 6 | REP 7 | REP 8 | REP 9 | MEAN | % Coefficient of Variation |
|---|---|---|---|---|---|---|---|---|---|---|---|
| A | 11.3 | 18.0 | 22.2 | 5.8 | 6.5 | 16.0 | 11.8 | 15.6 | 16.5 | 13.7 | 39% |
| B | 11.3 | 8.5 | 9.6 | 4.5 | 5.0 | 10.6 | 6.9 | 8.0 | 12.4 | 8.5 | 32% |

TABLE 6-continued

Young's Modulus (N/mm).

| | REP 1 | REP 2 | REP 3 | REP 4 | REP 5 | REP 6 | REP 7 | REP 8 | REP 9 | MEAN | % Coefficient of Variation |
|---|---|---|---|---|---|---|---|---|---|---|---|
| C | 19.1 | 18.4 | 8.9 | 28.1 | 18.6 | 22.7 | 17.7 | 27.2 | 16.5 | 19.7 | 30% |
| D | 14.3 | 16.0 | 18.3 | 16.6 | 18.1 | 7.1 | 22.0 | 14.0 | 14.8 | 15.7 | 26% |
| E | 4.9 | 16.4 | 5.0 | 4.1 | 6.3 | 5.5 | 1.1 | 3.6 | 4.1 | 5.7 | 75% |
| F | 4.8 | 2.1 | 5.5 | 3.1 | 3.7 | 6.2 | 1.0 | 6.9 | 4.5 | 4.2 | 46% |
| G | 11.3 | 13.9 | 9.0 | 6.8 | 21.2 | 3.1 | 6.5 | 8.3 | 17.0 | 10.8 | 53% |
| H | 25.4 | 19.8 | 15.8 | 12.8 | 13.5 | 11.9 | 8.7 | 13.6 | 6.6 | 14.2 | 40% |
| I | 8.2 | 2.2 | 15.0 | 3.8 | 21.0 | 14.4 | 15.9 | 3.4 | 5.8 | 9.9 | 68% |
| J | 3.8 | 11.9 | 8.8 | 13.4 | 3.6 | 10.2 | 23.6 | 7.2 | 9.0 | 10.2 | 59% |
| K | 21.9 | 4.7 | 27.6 | 22.1 | 30.2 | 12.7 | 24.1 | 19.2 | 2.2 | 18.3 | 53% |
| L | 25.6 | 1.0 | 22.0 | 9.8 | 26.7 | 23.9 | 17.4 | 16.6 | 26.8 | 18.9 | 46% |
| M | 7.0 | 6.0 | 5.6 | 11.2 | 5.2 | 7.8 | 10.2 | 6.6 | 6.4 | 7.3 | 28% |

While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. method of making a snack food product comprising,
    (a) providing a plurality of cut or shaped food pieces comprising a fruit or a vegetable;
    (b) exposing the food pieces to a solution comprising about 0.1-5 wt % of one or more starch-reducing enzymes and about 0.1 to about 5 wt % $CaCl_2$;
    (c) thereafter blanching the food pieces for a time sufficient to inactivate the enzymes and rinsing the food pieces with water, wherein the food pieces have an initial moisture level after the blanching step;
    (d) infusing the food pieces with NaCl;
    (e) reducing the initial moisture level of the food pieces by cooking the food pieces in bulk in at least one oven or drier set at a first temperature of about 325-450° F. for a first time period of about 0.5-25 min. to reduce the initial moisture level to an intermediate moisture level;
    (f) cooking a bulk quantity of the intermediate moisture food pieces in the one or more driers or ovens set at a second temperature of about 225-325° F. for a second time period of about 4-35 minutes, wherein the second temperature is lower than the first temperature, wherein steps (d) and (e) are conducted without frying the pieces in oil, to yield a snack food product having a moisture level of about 2-5 wt-%; and
    (g) optionally adding a predetermined amount of digestible and/or synthetic oil or fat to the food pieces and/or to the food product, wherein the snack food product exhibits one or more characteristics of a snack food product produced by frying a food piece in oil wherein the characteristics are selected from the group consisting of texture, flavor, crispness, crunchiness, color and appearance, to yield a snack food product containing up to about 35 wt-% fat.

2. The method of claim 1, wherein in step (f), the food pieces are cooked at about 300-325° F.

3. The method of claim 2, wherein the food pieces are cooked in a dryer/oven providing an air velocity of about 500-10,000 feet per minute.

4. The method of claim 1, wherein in step (e) the food pieces are cooked for a time of about 0.5 to about 14 minutes.

5. The method of claim 1 wherein the food pieces are cooked at about 350-400° F. in step (e).

6. The method of claim 1, wherein step (f) comprises cooking the food pieces at a temperature of about 275-300° F. for a time of about 6 to about 12 minutes.

7. The method of claim 1, wherein the food pieces are cooled and stored at ambient, refrigeration or freezer conditions after the food pieces are brought to the first temperature for the first time period, and before the food pieces are brought to the second temperature for the second time period.

8. The method of claim 1 wherein the food pieces are exposed to a solution comprising one or more of amylase or amyloglucosidase.

9. The method of claim 8, wherein in step (b) the food pieces are exposed to the solution for a time of about 1 to about 3 minutes.

10. The method of claim 1, wherein the food pieces are cooked in at least one rotary drier or oven, at least one fluidized bed drier or oven or at least one microwave drier or oven.

11. The method of claim 1, wherein said food is selected from the group consisting of beets, zucchini, carrots, eggplant, apples, pears, bananas, rutabaga, plantain, taro, okra, onions, parsnips, yams, sweet potatoes, yucca, and potatoes.

12. The method of claim 1, wherein said cut food pieces are slices, strips or sticks.

13. The method of claim 1, wherein said blanching comprises a wet blanch.

14. The method of claim 13, wherein said wet blanch comprises treating said cut food pieces in an aqueous solution at a temperature of about 140° F.-248° F., and for about 15 seconds to about 10 minutes.

15. The method of claim 1, that further comprises application of a predetermined amount of digestible and/or synthetic fat or oil to said food pieces.

16. The method of claim 15, comprising applying a predetermined amount of digestible and/or synthetic fat or oil to the food pieces prior to cooking the food pieces.

17. The method of claim 1, comprising applying a predetermined amount of digestible and/or synthetic fat or oil to the snack food product.

18. The method of claim 16, wherein the fat content of the snack food product is increased to up to about 15 wt-%.

19. The method of claim 1, wherein in step (d), a NaCl solution is sprayed onto the food pieces.

20. The method of claim 9 wherein the pieces are fluidized in air by said at least one drier or oven in steps (e) or (f).

21. The method of claim 1 wherein step (g) is absent and the snack food product has a fat content of less than about 0.5 wt-%.

22. The method of claim 1 wherein the intermediate moisture level is about 40-70%.

* * * * *